(12) United States Patent
Shan et al.

(10) Patent No.: US 9,600,226 B2
(45) Date of Patent: Mar. 21, 2017

(54) MEDIA PLAYBACK PROCESSING AND CONTROL METHOD, APPARATUS, AND SYSTEM

(71) Applicant: Huawei Device Co., Ltd., Shenzhen (CN)

(72) Inventors: Zhenwei Shan, Shenzhen (CN); Yu Zhu, Shenzhen (CN); Huangwei Wu, Shenzhen (CN); Qinliang Zhang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 299 days.

(21) Appl. No.: 14/453,802

(22) Filed: Aug. 7, 2014

(65) Prior Publication Data

US 2014/0371894 A1 Dec. 18, 2014

Related U.S. Application Data

(63) Continuation of application No. PCT/CN2013/071113, filed on Jan. 30, 2013.

(30) Foreign Application Priority Data

Feb. 7, 2012 (CN) .......................... 2012 1 0026138

(51) Int. Cl.
   *G06F 17/00* (2006.01)
   *G06F 3/16* (2006.01)
   (Continued)

(52) U.S. Cl.
   CPC .......... *G06F 3/165* (2013.01); *G06F 17/3074* (2013.01); *H04L 65/4084* (2013.01);
   (Continued)

(58) Field of Classification Search
   CPC ........ G06F 3/0484; G06F 3/167; G06F 21/10; G06F 17/30056; G06F 2203/04104
   See application file for complete search history.

(56) References Cited

U.S. PATENT DOCUMENTS

2004/0172376 A1   9/2004   Kobori et al.
2006/0168126 A1   7/2006   Costa-Requena et al.
(Continued)

FOREIGN PATENT DOCUMENTS

CA   2671142 A1   1/2010
CN   1988544 A    6/2007
(Continued)

OTHER PUBLICATIONS

Partial English Translation and Abstract of Chinese Patent Application No. CN102143385A, Sep. 1, 2014, 8 pages.
(Continued)

*Primary Examiner* — Truong Vo
(74) *Attorney, Agent, or Firm* — Conley Rose, P.C.

(57) ABSTRACT

A media playback processing and control method, apparatus, and system are provided. The processing method includes: receiving, by a central server, a query request of a control device, and returning a query response to the control device according to a resource information table; receiving a resource request of a selected display device selected by the control device; and querying the resource information table, determining that a selected media resource corresponding to information about a selected storage path is stored on a first media server (MS), and determining a second MS with a conversion capability to convert a media format of the selected media resource into a media format supported by a playback capability of the selected display device, so as to
(Continued)

enable the selected display device to play a media resource converted by the second MS from the selected media resource.

30 Claims, 11 Drawing Sheets

(51) Int. Cl.
    H04L 29/06       (2006.01)
    G06F 17/30       (2006.01)
    H04N 21/41       (2011.01)
    H04N 21/433      (2011.01)
    H04N 21/436      (2011.01)
    H04N 21/4402     (2011.01)
    H04N 21/45       (2011.01)
    H04N 21/258      (2011.01)
    H04N 21/414      (2011.01)

(52) U.S. Cl.
    CPC ....... *H04N 21/4122* (2013.01); *H04N 21/436* (2013.01); *H04N 21/4332* (2013.01); *H04N 21/44029* (2013.01); *H04N 21/440218* (2013.01); *H04N 21/4516* (2013.01); *H04N 21/25825* (2013.01); *H04N 21/25833* (2013.01); *H04N 21/41407* (2013.01)

(56) References Cited

U.S. PATENT DOCUMENTS

| | | |
|---|---|---|
| 2006/0245490 A1 | 11/2006 | Yoshizawa et al. |
| 2007/0239896 A1 | 10/2007 | Sohn et al. |
| 2007/0250536 A1 | 10/2007 | Tanaka et al. |
| 2008/0134012 A1 | 6/2008 | Kokes et al. |
| 2010/0005183 A1 | 1/2010 | Ding et al. |
| 2010/0135637 A1* | 6/2010 | McDermott ......... G11B 27/034 386/344 |
| 2011/0047214 A1 | 2/2011 | Lee et al. |
| 2011/0131518 A1 | 6/2011 | Ohashi |
| 2011/0252082 A1 | 10/2011 | Cobb et al. |
| 2011/0252118 A1 | 10/2011 | Pantos et al. |
| 2012/0096119 A1 | 4/2012 | Nakamura et al. |
| 2013/0182798 A1 | 7/2013 | Lozano et al. |

FOREIGN PATENT DOCUMENTS

| | | |
|---|---|---|
| CN | 101002469 A | 7/2007 |
| CN | 101350808 A | 1/2009 |
| CN | 101516056 A | 8/2009 |
| CN | 101543011 A | 9/2009 |
| CN | 101672843 A | 3/2010 |
| CN | 101674310 A | 3/2010 |
| CN | 102143385 A | 8/2011 |
| CN | 102882845 A | 1/2013 |
| CN | 103237215 A | 8/2013 |
| EP | 1463323 A1 | 9/2004 |
| EP | 2495934 A1 | 9/2012 |
| EP | 2704397 A2 | 3/2014 |
| JP | 2004046789 A | 2/2004 |
| JP | 2006311267 A | 11/2006 |
| JP | 2006339855 A | 12/2006 |
| JP | 2007317021 A | 12/2007 |
| JP | 2007336214 A | 12/2007 |
| JP | 2008005254 A | 1/2008 |
| JP | 20080206039 A | 9/2008 |
| JP | 2011044150 A | 3/2011 |
| JP | 2011118470 A | 6/2011 |
| KR | 20050002793 A | 1/2005 |
| KR | 20070037914 A | 4/2007 |
| WO | 2011048625 A | 4/2011 |
| WO | 2011127263 A2 | 10/2011 |

OTHER PUBLICATIONS

Woutervan, B., "Render Side Content Transforms," UPnP AV Change Request: CR-097, Version 0.89, Jun. 5, 2008, 78 pages.
Kang, J., "Server-side Transformation," UPnP AV Change Request: CR-099, Version 0.89, Jul. 11, 2011, 50 pages.
Foreign Communication From a Counterpart Application, PCT Application No. PCT/CN2013/071113, English Translation of International Search Report dated May 9, 2013, 2 pages.
Foreign Communication From a Counterpart Application, PCT Application No. PCT/CN2013/071113, English Translation of Written Opinion dated May 9, 2013, 18 pages.
Foreign Communication From a Counterpart Application, Chinese Application No. 201210026138.X, Chinese Office Action dated Mar. 15, 2016, 11 pages.
Partial English Translation and Abstract of Chinese Patent Application No. CN1988544, Apr. 18, 2016, 4 pages.
Partial English Translation and Abstract of Chinese Patent Application No. CN101516056, Apr. 18, 2016, 3 pages.
Partial English Translation and Abstract of Chinese Patent Application No. CN103237215, Apr. 18, 2016, 9 pages.
"WD My Cloud EX2," Personal Cloud Storage, User Manual, Jan. 2014, 169 pages.
"3rd Generation Partnership Project; Technical Specification Group; Telecommunication management; Charging management; Charging data description for application services (Release 5)," 3GPP TS 32.235, V5.5.0, Technical Specification, Sep. 2005, 57 pages.
Foreign Communication From a Counterpart Application, Korean Application No. 10-2014-7023381, Korean Office Action dated Jun. 12, 2015, 6 pages.
Foreign Communication From a Counterpart Application, Korean Application No. 10-2014-7023381, English Translation of Korean Office Action dated Jun. 25, 2015, 11 pages.
Partial English Translation and Abstract of Japanese Patent Application No. JP2004-046789, Sep. 16, 2015, 111 pages.
Partial English Translation and Abstract of Japanese Patent Application No. JP2006-311267, Sep. 16, 2015, 36 pages.
Partial English Translation and Abstract of Japanese Patent Application No. JP20006-339855, Sep. 16, 2015, 32 pages.
Partial English Translation and Abstract of Japanese Patent Application No. JP2007-317021, Sep. 16, 2015, 27 pages.
Partial English Translation and Abstract of Japanese Patent Application No. JP2007336214, Sep. 16, 2015, 31 pages.
Partial English Translation and Abstract of Japanese Patent Application No. JP2008-005254, Sep. 16, 2015, 52 pages.
Partial English Translation and Abstract of Japanese Patent Application No. JP2008206039, Sep. 16, 2015, 28 pages.
Partial English Translation and Abstract of Japanese Patent Application No. JP2011044150, Sep. 16, 2015, 38 pages.
Foreign Communication From a Counterpart Application, Japanese Application No. 2014-555929, Japanese Office Action dated Jul. 28, 2015, 7 pages.
Foreign Communication From a Counterpart Application, Japanese Application No. 2014-555929, English Translation of Japanese Office Action dated Jul. 28, 2015, 8 pages.
Ritchie, J., et al., "UPnP AV Architecture:1," Version 1.0, Sep. 30, 2008, 30 pages.
Foreign Communication From a Counterpart Application, European Application No. 13746340.2, Extended European Search Report dated Mar. 9, 2015, 12 pages.
Foreign Communication From a Counterpart Application, Korean Application No. 10-2014-7023381, Korean Office Action dated Dec. 23, 2015, 6 pages.
Foreign Communication From a Counterpart Application, Korean Application No. 10-2014-7023381, English Translation of Korean Office Action dated Jan. 5, 2016, 10 pages.
Foreign Communication From a Counterpart Application, Chinese Application No. 201210026138.X, Chinese Office Action dated Aug. 19, 2016, 12 pages.

* cited by examiner

MEDIA PLAYBACK PROCESSING AND CONTROL METHOD, APPARATUS, AND SYSTEM

CROSS-REFERENCE TO RELATED APPLICATIONS

This application is a continuation of International Application No. PCT/CN2013/071113, filed on Jan. 30, 2013, which claims priority to Chinese Patent Application No. 201210026138.X, filed on Feb. 7, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present invention relate to the field of network technologies, and in particular, to a media playback processing and control method, apparatus, and system.

BACKGROUND

With development of digital home and widespread digitalization of consumer electronics (CE), an increasing number of digital entertainment devices and home appliances appear in a family. To form a home area network by connecting, in a wired or wireless manner, home area network devices such as the entertainment devices and home appliances, so as to implement functions of content sharing, mutual control, and the like, is a digital home area network concept that the industry is conceiving and striving to achieve.

To implement interworking and control among different types of home devices, an increasing number of home area network devices support universal plug and play (UPnP). Further, to implement a media sharing scenario among a plurality of devices on a home area network, the UPnP defines an audio and video (AV) standard. This standard defines three types of entities on the home area network: a media server (MS), a device for storing a media resource; a media renderer (MR), a device for playing the media resource; and an AV control point (CP), an entity for controlling the foregoing two devices. An AV CP browses the media resource of the MS, and then the MR plays the media. In this way, a function that the MR plays the media resource of the MS is implemented.

During a process of implementing the present invention, the inventors find that an existing solution only relates to a home area network that includes a single MS and a single MR, and a media resource on the MS cannot be played when a format of the media resource cannot be played in the MR, and the MS is incapable of converting the format of the media resource into a format that can be played by the MR.

SUMMARY

Embodiments of the present invention provide a media playback processing and control method, apparatus, and system, to resolve a problem in the prior art that the prior art relates only to a home area network that includes a single MS and a single MR, and a media resource on the MS cannot be played when a format of the media resource cannot be played in the MR, and the MS is incapable of converting the format of the media resource into a format that can be played by the MR.

According to one aspect, an embodiment of the present invention provides a media playback processing method, including: receiving, by a central server, a query request of a control device, and returning a query response to the control device according to a pre-generated resource information table, where the query response includes a storage path of at least one media resource; receiving a resource request of a selected display device selected by the control device, where the resource request includes information about a selected storage path; and querying the resource information table, determining that a selected media resource corresponding to the information about the selected storage path is stored on a first media server, and determining a second media server with a conversion capability to convert a media format of the selected media resource into a media format supported by a playback capability of the selected display device, so as to enable the selected display device to play a media resource converted by the second media server from the selected media resource.

According to another aspect, an embodiment of the present invention provides a media playback processing method, including: receiving, by a central server, a query request of a control device; and returning a query response to the control device according to a pre-generated resource information table, where the query response includes a storage path of at least one media resource and an identifier of an optional display device, and a playback capability of the optional display device supports a media format of the media resource, so as to enable the control device to select one media resource and one optional display device of the media resource to play the media resource.

According to another aspect, an embodiment of the present invention provides a media playback control method, including: determining, by a control device, a query condition, and sending a query request that includes the query condition to a central server; receiving a query response returned by the central server, and determining a selected content name as well as an identifier of a selected display device according to a selection instruction, where the query response includes a storage path of at least one media resource and an identifier of an optional display device, and the storage path points to one of at least one media server that includes the central server; determining, from the storage path of the at least one media resource, a selected storage path corresponding to the selected content name as well as the identifier of the selected display device, where the selected storage path includes the selected content name, and sending the selected storage path to the selected display device; and sending a playback request to the selected display device, so as to enable the selected display device to acquire a media resource from the at least one media server according to the selected storage path and play the media resource.

According to another aspect, an embodiment of the present invention provides a central server, including: a first interface configured to receive a query request of a control device and return a query response to the control device according to a pre-generated resource information table, where the query response includes a storage path of at least one media resource; a second interface configured to receive a resource request of a selected display device selected by the control device, where the resource request includes information about a selected storage path; and a querying module configured to query the resource information table, determine that a selected media resource corresponding to the information about the selected storage path is stored on a first media server, and determine a second media server with a conversion capability to convert a media format of the selected media resource into a media format supported by a playback capability of the selected display device, so as to enable the selected display device to play a media resource converted by the second media server from the selected media resource.

According to another aspect, an embodiment of the present invention provides a central server, including: a receiving module configured to receive a query request of a control device; and a sending module configured to return a query response to the control device according to a pre-generated resource information table, where the query response includes a storage path of at least one media resource and an identifier of an optional display device, and a playback capability of the optional display device supports a media format of the media resource, so as to enable the control device to select one media resource and one optional display device of the media resource to play the media resource.

According to still another aspect, an embodiment of the present invention provides a control device, including: a determining module configured to determine a query condition and send a query request that includes the query condition to a central server; a processing module configured to receive a query response returned by the central server, and determine a selected content name as well as an identifier of a selected display device according to a selection instruction, where the query response includes a storage path of at least one media resource and an identifier of an optional display device, and the storage path points to one of at least one media server that includes the central server; a selecting module configured to determine, from the storage path of the at least one media resource, a selected storage path corresponding to the selected content name as well as the identifier of the selected display device, where the selected storage path includes the selected content name, and send the selected storage path to the selected display device; and a playing module configured to send a playback request to the selected display device, so as to enable the selected display device to acquire a media resource from the at least one media server according to the selected storage path and play the media resource.

According to still another aspect, an embodiment of the present invention further provides a media playback processing and control system, including: a control device, at least one display device, and at least one media server, where a media server in the at least one media server is the central server described above.

At least one technical solution of the plurality of technical solutions above has the following advantages or beneficial effects.

The embodiments of the present invention adopts the following technical means: setting a central server, where the central server returns a query response to a control device according to a pre-generated resource information table, queries the resource information table according to a resource request of a selected display device, determines that a selected media resource corresponding to information about a selected storage path in the resource request is stored on a first media server, and determines a second media server with a conversion capability to convert a media format of the selected media resource into a media format supported by a playback capability of the selected display device, so as to enable the selected display device to play a media resource converted by the second media server from the selected media resource. This technical means overcomes a deficiency in the prior art that, on a home area network that includes a single MS and a single MR, when a format of a media resource on the MS cannot be played on the MR, and the MS is not capable of converting the format of the media resource into a format that can be played by the MR, the media resource cannot be played; and provides a set of solutions with a plurality of MSs that may coordinate media resources and conversion capabilities of the plurality of MSs, so as to adapt to the playback capability of the selected display device, thereby greatly enhancing user experience.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

To give a clear and detailed description of the embodiments of the present invention, relevant information of UPnP is introduced firstly. In a UPnP system, a user may control a home area network device by using a CP on the home area network; by invoking a related control command (action) of the UPnP device, the CP uses a UPnP protocol to read status information of a UPnP device on the home area network and control the UPnP device so as to perform corresponding operations.

Figure 1:
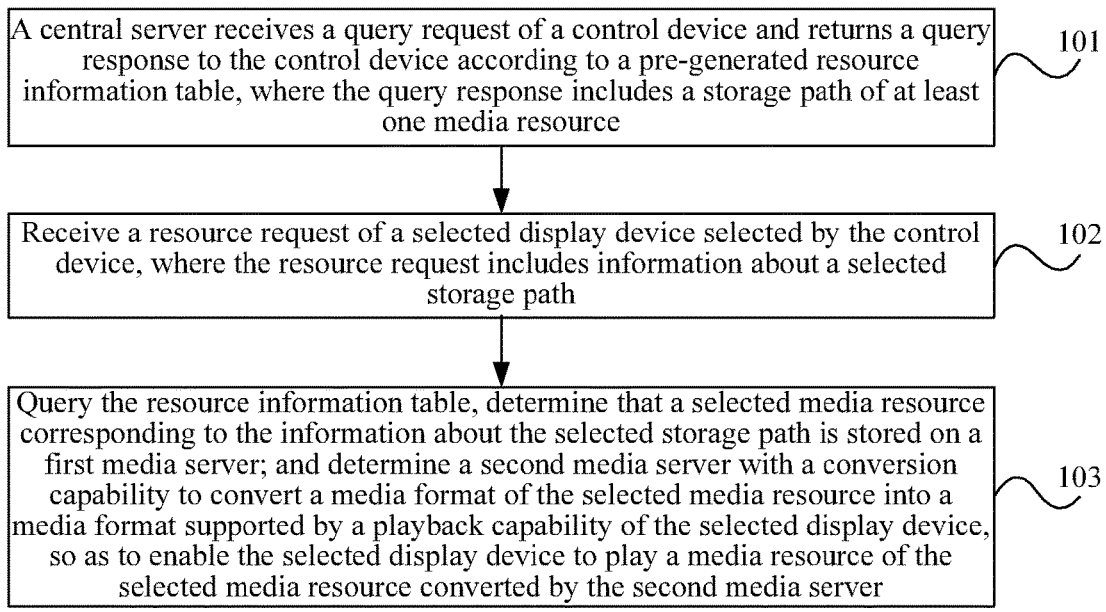
FIG. 1 is a schematic flowchart of a media playback processing method according to Embodiment 1 of the present invention.

FIG. 1 is a schematic flowchart of a media playback processing method according to Embodiment 1 of the present invention. As shown in FIG. 1, the method includes the following steps:

Step 101. A central server receives a query request of a control device and returns a query response to the control device according to a pre-generated resource information table, where the query response includes a storage path of at least one media resource.

The central server herein may also serves as a media server; the resource information table may be generated according to media content information and conversion capability information of the media server as well as playback capability information of a display device on a home area network. It should be noted that there may be a plurality of media servers and at least one display device on the home area network to which an embodiment of the present invention is applied. In addition, the central server and the control device may be independently set, or be set as a whole.

Step 102. Receive a resource request of a selected display device selected by the control device, where the resource request includes information about a selected storage path.

The selected display device herein may be selected by a user by using the control device, or automatically selected by the control device. The selected storage path is determined by the control device according to a selection instruction of the user or automatically determined from the storage path of the at least one media resource, where the storage path is included in the query response, and the selected storage path is sent to the selected display device. The information about the selected storage path may be the selected storage path itself, or a part of the information about the selected storage path. Generally, the storage path includes a host part and a path part, where the host part may be a host name or a host Internet Protocol (IP) address, and the path part may be a relative path on the host. For example, if the selected storage path is a universal resource identifier (URI) of an absolute path, the information about the selected storage path may be the URI of the absolute path, and may also be a path part in the URI of the absolute path, that is, a URI of a relative path. Generally, the resource request may also carry an identifier of the selected display device. Because in step 102, it is the central server that receives the resource request, in other words, the selected storage path in the resource request points to the central server. For example, if the selected storage path is a URI of one absolute path, the host part of the selected storage path is an address of the central server. If the selected storage path in the resource request sent by the selected display device points to another media server, the another media server may process the resource request according to a method in the prior art.

Step 103. Query the resource information table, determine that a selected media resource corresponding to the information about the selected storage path is stored on a first media server, and determine a second media server with a conversion capability to convert a media format of the selected media resource into a media format supported by a playback capability of the selected display device, so as to enable the selected display device to play a media resource converted by the second media server from the selected media resource.

Both the first media server and second media server herein may be any media server each, including the central server. For example, the playback capability of the selected display device only supports playback of a media resource in an Moving Pictures Expert Group 2 (MPEG2) format or a Windows Media Video (WMV) format; the selected media resource is stored on the first media server, and a media format of the selected media resource is Moving Pictures Expert Group 4 (MPEG4); the second media server has a conversion capability to convert the media resource from the MPEG4 format to the MPEG2 format or the WMV format.

Specifically, in step 103, after the determining that a selected media resource corresponding to the information about the selected storage path is stored on a first media server, and determining a second media server with a conversion capability to convert a media format of the selected media resource into a media format supported by a playback capability of the selected display device, the method further includes:

If the central server is not the second media server, the central server instructs the second media server to acquire the selected media resource from the first media server, so as to enable the second media server to convert the selected media resource and return a selected media resource after conversion to the central server, and the central server sends the selected media resource after conversion to the selected display device. Alternatively, the central server may further instruct the first media server to actively push the selected media resource to the second media server, so as to enable the second media server to convert the selected media resource.

If the central server is not the second media server, the central server redirects the resource request to the second media server, so as to enable the second media server to acquire the selected media resource from the first media server, convert the selected media resource, obtain the selected media resource after conversion, and directly send the selected media resource after conversion to the selected display device.

If the central server is the second media server, the central server acquires the selected media resource from the first media server, converts the selected media resource to obtain the selected media resource after conversion, and sends the selected media resource after conversion to the selected display device.

In an optional embodiment of the present invention, before step 101, the method further includes: acquiring, by the central server, playback capability information of at least one display device that includes the selected display device as well as media content information and conversion capability information of a plurality of media servers that includes the central server, the first media server, and the second media server; and generating the resource information table according to the playback capability information of the at least one display device as well as the media content information and the conversion capability information of the plurality of media servers, where the resource information table includes a resource identifier, a media format, and a storage path of at least one media resource.

In another optional embodiment of the present invention, the resource information table includes an original resource entry and a converted resource entry, and the generating the resource information table according to the playback capability information of the at least one display device as well as the media content information and the conversion capability information of the plurality of media servers specifically includes: determining a playback capability intersection set according to the playback capability information of the at least one display device, where a playback capability of each display device supports at least one media format in the playback capability intersection set; determining an original media resource according to the media content information of the plurality of media servers, and generating the original resource entry, where the original resource entry includes an original identifier as well as a resource identifier, a media format, and a storage path of the original media resource, and the storage path of the original media resource points to a media server that stores the original media resource; and determining a converted media resource corresponding to the original media resource according to a media format that is in the playback capability intersection set and is different from the media format of the original media resource, generating the converted resource entry corresponding to the original resource entry, where the converted resource entry includes a conversion identifier as well as a resource identifier, a media format, and a storage path of the converted media resource, and establishing a correspondence between the converted resource entry and a media server with a conversion capability to convert the media format of the original media resource into the media format of the converted media resource, where the media format of the converted media resource is different from the media format of the corresponding original media resource, and the media format of the converted media resource is in the playback capability intersection set.

Specifically, the playback capability information of the display device includes a media format supported by the playback capability of the display device. Correspondingly, the playback capability of the display device supports a media format, which indicates that the display device is capable of playing a media resource in this media format. In addition, the storage path in the converted resource entry may point to a virtual address on the central server.

The playback capability intersection set includes at least one media format, and it is better to include fewer media formats. For example, an MR 1 supports media formats MPEG4 and MPEG2; an MR 2 supports media formats MPEG2, Audio Video Interleave (AVI), and WMV; an MR 3 supports media formats WMV, Advanced Video Coding (AVC), and H.264; then a playback capability intersection set of the MR 1, 2, and 3 is {MPEG2, WMV}. Further, the playback capability information of the display device may further include a resolution and a transport protocol supported by the playback capability of the display device; correspondingly, the display capability intersection set may further include the resolution and the transport protocol. In addition, when whether the display device is capable of playing a media resource is determined, it is necessary to determine whether the playback capability of the display device supports the resolution and the transport protocol of the media resource. When the resolution and the transport protocol are further considered, it is assumed that playback capability information of the MR 1, 2, and 3 is shown in Table 1.

TABLE 1

| Display device | Supported media format | Supported resolution | Supported transport protocol |
|---|---|---|---|
| MR 1 | MPEG4, MPEG2 | 1080p, 720p | HTTP, RTP/RTSP |
| MR 2 | MPEG2, AVI, WMV | 720p, 480 | HTTP |
| MR 3 | WMV, AVC, H.264 | 720p, 240 | HTTP |

According to Table 1, the playback capability intersection set of the MR 1, 2 and 3 includes the media formats MPEG2, MPEG4, a resolution 720p, and a transport protocol hypertext transfer protocol (HTTP). If same media content has two media resources separately corresponding to the playback capability intersection set, that is a media resource whose media format is MPEG2, resolution is 720 progressive scan (p), and transport protocol is HTTP and a media resource whose media format is MPEG4, resolution is 720p, and transport protocol is HTTP, the media content may be played on any display device.

Meanwhile, for any media resource, the media resource has only one media format. If the playback capability intersection set also only includes this media format, the media resource may be played on any display device; if this media format is not included in the playback capability intersection set, a converted resource corresponding to the media resource may further be determined to generate a converted resource entry. Specifically, the determining a converted media resource corresponding to the original media resource according to a media format that is in the playback capability intersection set and is different from the media format of the original media resource, and generating a converted resource entry corresponding to the original resource entry specifically includes: if the playback capability intersection set includes N media formats and the media format of the original media resource is not in the playback capability intersection set, where N is a natural number that is not less than 2, determine N converted media resources corresponding to the original media resource according to the conversion capability information and the original media resource, and generate N converted resource entries, where the N converted resource entries separately include the N media formats; if the playback capability intersection set includes N media formats and the media format of the original media resource is in the playback capability intersection set, where N is a natural number that is not less than 2, determine (N−1) converted media resources corresponding to the original media resource according to the conversion capability information and the original media resource, and generate (N−1) converted resource entries, where the (N−1) converted resource entries separately include all media formats except the media format of the original media resource in the N media formats.

For example, the playback capability intersection set includes MPEG2 and MPEG4. If a media format of an original media resource 1 is WMV, two converted media resources corresponding to the original media resource 1 are determined and two converted resource entries are generated, where media formats in the two converted resource entries respectively are MPEG2, MPEG4; if the media format of the original media resource 1 is MPEG2, one converted media resource corresponding to the original media resource 1 is determined, and a converted resource entry is generated, where a media format in the one converted resource entry is MPEG4. It should be noted that a correspondence between the original resource entry of the original media resource and the converted resource entry of the converted media resource corresponding to the original media resource may be established by setting a same identifier, and may also be established according to positions of the original resource entry and the converted resource entry in the resource information table.

Further, after the second media converts the selected media resource, the method may further include: downloading, by the first media server, the selected media resource after conversion; and updating, by the central server, the resource information table according to the selected media resource after conversion.

Specifically, if the first media server is the central server, the central server downloads the selected media resource after conversion from the second media server. If the first media server is not the central server, the central server instructs the first media server to download the selected media resource after conversion from the central server or the second media server; alternatively, the central server may also directly push the selected media resource after conversion to the first media server, or instructs the second media server to push the selected media resource after conversion to the first media server.

The updating, by the central server, the resource information table according to the selected media resource after conversion specifically includes: setting, by the central server, the selected media resource after conversion to be the original media resource, and updating the original resource entry and the converted resource entry.

Specifically, the converted resource entry corresponding to a previously generated selected media resource (that is, the converted media resource) may be deleted and an original resource entry corresponding to the selected media resource after conversion may be added.

Further, based on the foregoing resource information table formed by the original resource entry and the converted resource entry, in step 101, before the returning a query response to the control device according to a pre-generated resource information table, the method may further include: querying, by the central server, the resource information table according to a query condition included in the query request; determining an original resource entry that meets the query condition, and adding a corresponding original resource response entry to the query response, where the original resource response entry includes the original identifier and the storage path of the original media resource that are in the original resource entry; and determining a converted resource entry that meets the query condition, and adding a corresponding converted resource response entry to the query response, where the converted resource response entry includes the conversion identifier and the storage path of the converted media resource that are in the converted resource entry.

Specifically, a storage path of each media resource includes a content name of the media resource; the control device may determine a corresponding content name according to the storage path in the query response and display the content name to a user. For example, a storage path in a converted resource entry corresponding to a converted media resource 1 is http://192.168.1.1:53013/MediaServer-Content_1/1/LetBulletsFly.wmv, where, 192.168.1.1 is an address of the central server, and "LetBulletsFly" is a content name of the converted media resource.

Further, when the selected display device adds the information about the selected storage path to the resource request to request the media resource from the central server, the central server may determine an original resource entry/a converted resource entry corresponding to the selected media resource according to the information about the selected storage path. Specifically, in step 103, the querying the resource information table specifically includes: finding a converted resource entry that includes the selected storage path according to the information about the selected storage path in the resource request; and determining an original resource entry corresponding to the converted resource entry that includes the selected storage path, determining a first media server to which a storage path in the corresponding original resource entry points, and determining a second media server corresponding to the converted resource entry that includes the selected storage path.

For example, when the information about the selected storage path is a URI of an absolute path, the central server may directly retrieve the resource information table according to the URI of the absolute path, and find an original media resource entry/a converted media resource entry that includes the URI of the absolute path; when the information about the selected storage path is a URI of a relative path, the central server may construct the URI of the absolute path according to the URI of the relative path and the address of the central server, then retrieve the resource information table according to the URI of the absolute path, and search for the original/converted media resource entry that includes the URI of the absolute path. Generally, before the selected display device adds the information about the selected storage path to the resource request to request the media resource from the central server, the selected display device may further establish a connection with a central server to which the selected storage path points according to the selected storage path. For example, the selected display device determines the address of the central server according to a host part in the URI of the absolute path, so as to establish an HTTP connection.

In a practical application, there are three cases in which the selected display device requests the media resource from the central server:

(1) The selected storage path is corresponding to the original media resource. In this case, there is the original resource entry that includes the selected storage path. In addition, because the storage path in the original resource entry is an actual storage path of the original media resource, the central server may determine that a selected media resource that is requested is a locally stored original media resource and may directly send the selected media resource that is locally stored to the selected display device.

(2) The selected storage path is corresponding to the converted media resource, and the central server has a corresponding conversion capability. In this case, there is the converted resource entry that includes the selected storage path; the central server may determine a corresponding storage path of the original media resource according to an original resource entry corresponding to the converted resource entry, so as to acquire the corresponding original media resource and send an original media resource after conversion to the selected display device.

(3) The selected storage path is corresponding to the converted media resource, and the central server does not have the corresponding conversion capability. In this case, although the selected storage path points to the central server, the selected storage path points to the virtual address on the central server. The central server determines an original resource entry and a media server corresponding to the converted resource entry that includes the selected storage path; and the central server instructs the corresponding media server to convert an actual media resource stored in the storage path in the corresponding original resource entry and sends an actual media resource after conversion to the selected display device.

In another optional embodiment of the present invention, the query response returned by the central server may further carry a media format of the at least one media resource; the control device may acquire the playback capability information of each display device and recommend a proper display device to the user according to a media format of each media resource in the query response.

In still another optional embodiment of the present invention, the central server may further determine, according to playback capability information of an acquired display device, an optional display device of each media resource, that is, a display device that is capable of playing this media resource, so as to add an identifier of the optional display device in the query response to enable a control point to recommend a proper display device to the user according to the optional display device of each media resource. Specifically, the original resource entry further includes an identifier of a first display device, where a playback capability of the first display device supports a media format in the original resource entry; and the converted resource entry further includes an identifier of a second display device, where a playback capability of the second display device supports a media format in the converted resource entry.

Further, the corresponding original resource response entry further includes the identifier of the first display device in the original resource entry; and the corresponding converted resource response entry further includes the identifier of the second display device in the converted resource entry.

If that some display devices also have certain conversion capabilities is considered, before the generating the resource information table according to the playback capability information of the at least one display device as well as the media content information and the conversion capability information of the plurality of media servers, the method further includes: acquiring, by the central server, conversion capability information of the at least one display device; and determining a comprehensive playback capability of each display device according to the playback capability information and the conversion capability information of the at least one display device.

The generating the resource information table according to the playback capability information of the at least one display device as well as the media content information and the conversion capability information of the plurality of media servers specifically includes: generating the resource information table according to the playback capability information and the conversion capability information of the at least one display device as well as the media content information and the conversion capability information of the plurality of media servers, where the resource information table includes the resource identifier, the media format, and the storage path of the at least one media resource and the identifier of the optional display device, and a comprehensive playback capability of the optional display device supports the media format.

For example, a playback capability of a display device supports MPEG2 and MPEG4, and meanwhile, the display device has a conversion capability to convert a media resource from a WMV format to the MPEG2 format, and then a comprehensive playback capability of the display device supports MPEG2, MPEG4, and WMV. That is, if the display device receives a media resource in the WMV format, the display device may convert the media resource from the WMV format to the MPEG2 format and play the media resource.

Correspondingly, when the resource information table is generated, the playback capability intersection set may also be determined according to the comprehensive playback capability of the display device. Specifically, the determining a playback capability intersection set according to the playback capability information of the at least one display device, where a playback capability of each display device supports at least one media format in the playback capability intersection set specifically includes: determining the playback capability intersection set according to the playback capability information and the conversion capability information of the at least one display device, where the comprehensive playback capability of each display device supports the at least one media format in the playback capability intersection set.

This embodiment of the present invention adopts the following technical means: setting a central server, where the central server returns a query response to a control device according to a pre-generated resource information table, queries the resource information table according to a resource request of a selected display device, determines that a selected media resource corresponding to information about a selected storage path in the resource request is stored on a first media server, and determines a second media server with a conversion capability to convert a media format of the selected media resource into a media format supported by a playback capability of the selected display device, so as to enable the selected display device to play a media resource converted by the second media server from the selected media resource. This technical means overcomes a deficiency in the prior art that, on a home area network that includes a single MS and a single MR, when a format of a media resource on the MS cannot be played on the MR, and the MS is not capable of converting the format of the media resource into a format that can be played by the MR, the media resource cannot be played; and provides a set of solutions with a plurality of MSs that may coordinate media resources and conversion capabilities of the plurality of MSs, so as to adapt to the playback capability of the selected display device, thereby greatly enhancing user experience.

Figure 2:
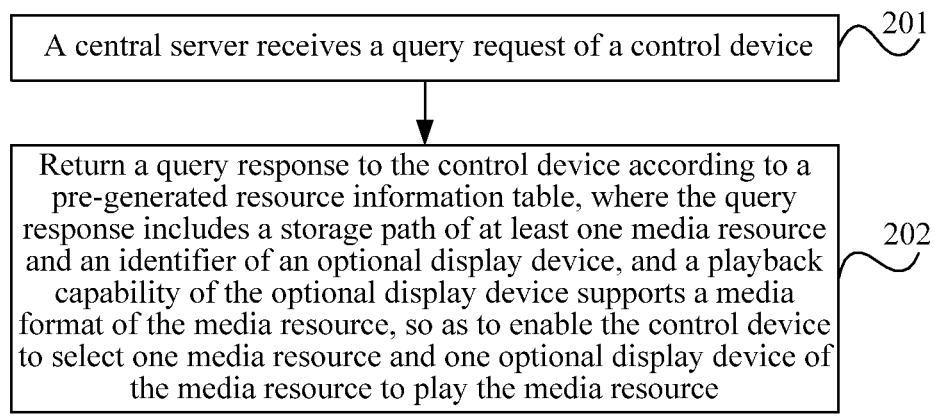
FIG. 2 is a schematic flowchart of a media playback processing method according to Embodiment 2 of the present invention.

FIG. 2 is a schematic flowchart of a media playback processing method according to Embodiment 2 of the present invention. As shown in FIG. 2, the method includes the following steps:

Step 201. A central server receives a query request of a control device.

The central server herein may also serves as a media server. It should be noted that there may be at least one media server and a plurality of display devices on a home area network to which an embodiment of the present invention is applied. In addition, the central server and the control device may be independently set, or be set as a whole.

Step 202. Return a query response to the control device according to a pre-generated resource information table, where the query response includes a storage path of at least one media resource and an identifier of an optional display device, and a playback capability of the optional display device supports a media format of the media resource, so as to enable the control device to select one media resource and one optional display device of the media resource to play the media resource.

Specifically, the resource information table may be generated according to media content information and conversion capability information of the media server on the home area network as well as playback capability information of the display device. Correspondingly, before step 201, the method may further include: acquiring, by the central server, playback capability information of a plurality of display devices as well as media content information and conversion capability information of at least one media server that includes the central server; generating the resource information table according to the playback capability information of the plurality of display devices as well as the media content information and the conversion capability information of the at least one media server, where the resource information table includes a resource identifier, a media format, and a storage path of the at least one media resource and the identifier of the optional display device, and the playback capability of the optional display device supports the media format.

Further, if a conversion capability of the display device is considered, before the generating the resource information table according to the playback capability information of the plurality of display devices as well as the media content information and the conversion capability information of the at least one media server, the method further includes: acquiring, by the central server, conversion capability information of the plurality of display devices; and determining a comprehensive playback capability of each display device according to the playback capability information and the conversion capability information of the plurality of display devices.

The generating the resource information table according to the playback capability information of the plurality of display devices as well as the media content information and the conversion capability information of the at least one media server specifically includes: generating the resource information table according to the playback capability information and the conversion capability information of the plurality of display devices as well as the media content information and the conversion capability information of the at least one media server, where the resource information table includes the resource identifier, the media format, and the storage path of the at least one media resource and the identifier of the optional display device, and a comprehensive playback capability of the optional display device supports the media format.

Specifically, for a specific form and a generating process of the resource information table and the query response, refer to the foregoing Embodiment 1.

In another optional embodiment of the present invention, when the control device makes a query, the central server may firstly return a pre-query response that does not include the identifier of the optional display device; when a user selects a content name by using the control device, the control device queries the central server for a storage path corresponding to the selected content name as well as the identifier of the optional display device by using a selected request. Specifically, before step 202, the method further includes: returning the pre-query response to the control device according to the pre-generated resource information table, where the pre-query response includes the storage path of the at least one media resource; receiving a selected request of the control device, where the selected request includes the selected content name; determining a storage path of at least one media resource corresponding to the selected content name as well as the identifier of the optional display device according to the resource information table, where the playback capability of the optional display device supports the media format of the media resource; and binding and adding the storage path of the at least one media resource corresponding to the selected content name as well as the identifier of the optional display device to the query response.

For example, an Action such as SelectContent (IN Content1) may be added on the central server. The control device requests the Action from the central server so as to select one content name, and then the central server returns the storage path of the at least one media resource corresponding to the content name and the identifier of the optional display device by using an Action response.

In addition, after step 202, the control device may further limit selection of the user to the selected display device only from the optional display device, and in this way, a process of converting the media format is unnecessary; if the selection of the user is not limited to the selected display device from the optional display device, when the user selects a non-optional display device, the control device may send the selected request to the central server again, and the central server queries the resource information table again according to the selected content name as well as an identifier of a selected non-optional display device, determines that the selected storage path is included, and feeds back to the selected display device by using the control device.

This embodiment of the present invention adopts the following technical means: setting a central server, where the central server returns a query response to a control device according to a pre-generated resource information table; and adds a storage path of a media resource and an identifier of an optional display device to the query response, so as to enable the control device to recommend a display device that is suitable for a selected media resource to a user according to the query response. This technical means overcomes the foregoing deficiency in the prior art and provides a set of solutions with a plurality of MSs, so as to recommend an MR that is capable of playing the selected media resource to the user by using the central server and the control device, thereby greatly enhancing user experience.

Figure 3:
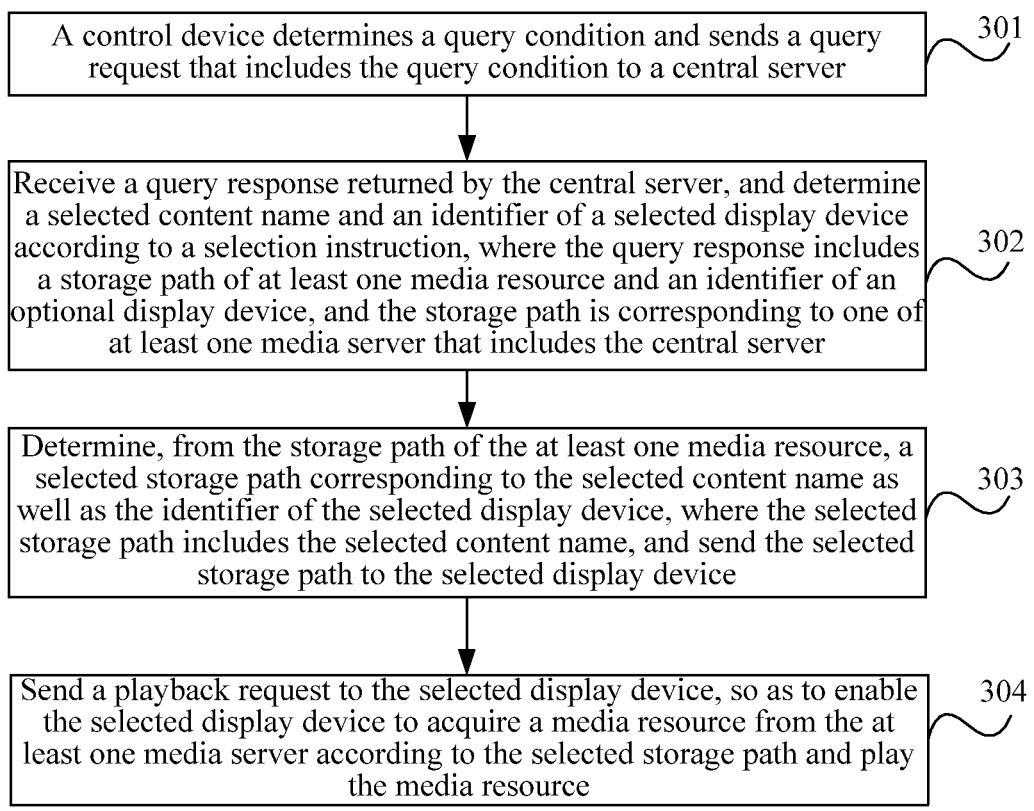
FIG. 3 is a schematic flowchart of a media playback control method according to Embodiment 3 of the present invention.

FIG. 3 is a schematic flowchart of a media playback control method according to Embodiment 3 of the present invention. As shown in FIG. 3, the method includes the following steps:

Step 301. A control device determines a query condition and sends a query request that includes the query condition to a central server.

Specifically, the control device may determine the query condition according to previous configuration. For example, the control device may be configured to automatically query all media resources when it is switched on. Alternatively, the control device may also determine the query condition according to a query instruction of a user. Generally, the control device may receive all types of instructions of the user through a user interface, where the user interface may be a keyboard, a touchscreen, or the like. The query instruction herein may be querying all the media resources, or querying a media resource conforming to a condition. For example, the query instruction includes a content name; that is, querying a media resource corresponding to the content name.

The control device and the central server may be set as a whole, or be independently set. When set independently, the control device may send the query request according to a communications protocol between the control device and the central server.

Step 302. Receive a query response returned by the central server, and determine a selected content name as well as an identifier of a selected display device according to a selection instruction, where the query response includes a storage path of at least one media resource and an identifier of an optional display device, and the storage path is corresponding to one of at least one media server that includes the central server.

Specifically, for how to return the query response by the central server according to the query request, refer to the foregoing Embodiment 2.

Step 303. Determine, from the storage path of the at least one media resource, a selected storage path corresponding to the selected content name as well as the identifier of the selected display device, where the selected storage path includes the selected content name, and send the selected storage path to the selected display device.

Specifically, if a storage path of only one media resource includes the selected content name, the media resource serves as a selected media resource and the storage path serves as the selected storage path. If storage paths of at least two media resources include the selected content name, one media resource whose optional display device identifier includes the selected display device may be selected as the selected media resource, and the storage path of the media resource serves as the selected storage path.

Step 304. Send a playback request to the selected display device, so as to enable the selected display device to acquire a media resource from the at least one media server according to the selected storage path, and play the media resource.

In an optional embodiment of the present invention, before the control device determines the query condition, the method further includes: identifying, by the control device, at least one display device and the at least one media server, and identifying the central server from the at least one media server.

Specifically, the control device may discover all display devices and media servers on a home area network during a device discovery process and identify the central server according to device description information collected during the device discovery process.

In an optional embodiment of the present invention, when receiving the query request in step 301, the central server directly returns the query response in step 302 to the control device, and the control device returns a content name of the media resource and the identifier of the optional display device to the user according to the query request for the user to select. In this scenario, step 302 specifically includes: receiving the query response; determining a content name of the at least one media resource according to the storage path of the at least one media resource, and displaying the content name of the at least one media resource and an identifier of the at least one display device; and receiving a double selection instruction, where the double selection instruction includes the selected content name as well as the identifier of the selected display device, and the selected content name is one of the content name of the at least one media resource.

Specifically, the double selection instruction is sent by the user through a user interface of the control device.

In another optional embodiment of the present invention, when receiving the query request in step 301, the central server does not directly return the query response in step 302 to the control device, but firstly returns a pre-query response that does not include the identifier of the optional display device; and the control device returns the content name of the media resource to the user according to the pre-query response, and then queries the central server for an identifier of an optional display device of each media resource corresponding to the selected content name according to a selected content name selected by the user. In this scenario, step 302 specifically includes: receiving a pre-query response returned by the central server, where the pre-query response includes the storage path of the at least one media resource, and the storage path points to one of the at least one media server that includes the central server; determining the content name of the at least one media resource according to the storage path of the at least one media resource, and displaying the content name of the at least one media resource and the identifier of the at least one display device; receiving a first single selection instruction, where the first single selection instruction includes the selected content name, and the selected content name is one of the content name of the at least one media resource; sending a selected request that includes the selected content name to the central server; and receiving the query response returned by the central server, where the query response includes the storage path of the at least one media resource corresponding to the selected content name as well as the identifier of the optional display device, where the storage path of the at least one media resource includes the selected content name.

Correspondingly, step 303 specifically includes: receiving a second single selection instruction, where the second single selection instruction includes the identifier of the selected display device; and determining, from the storage path of the at least one media resource corresponding to the selected content name, the selected storage path corresponding to the identifier of the selected display device.

Specifically, both the first single selection and the second single selection are sent by the user through the user interface of the control device.

In still another optional embodiment of the present invention, there may be a plurality of media resources with same content names in the query response/pre-query response, and the control device may combine the same content names when displaying the plurality of media resources to the user. Specifically, the query response includes an original resource response entry and a converted resource response entry, where the original resource response entry includes an original identifier, a storage path of an original media resource, and an identifier of a first display device, and the converted resource response entry includes a conversion identifier, a replacing storage path, and an identifier of a second display device.

Correspondingly, the displaying the content name of the at least one media resource specifically includes: determining content names corresponding to the original resource response entry and those corresponding to the converted resource response entry; and determining at least one resource family response entry, where the resource family response entry includes an original resource response entry and a converted resource response entry corresponding to a same content name, and displaying a content name of each resource family response.

Step 303 specifically includes: determining a resource family response entry corresponding to the selected content name; if the original resource response entry that includes the identifier of the selected display device exists in the corresponding resource family response entry, determining that a storage path in the original resource response entry is the selected storage path; and if the original resource response entry that includes the identifier of the selected display device does not exist in the corresponding resource family response entry, but the converted resource response entry that includes the identifier of the selected display device exists in the corresponding resource family response entry, determining that a storage path in the converted resource response entry is the selected storage path.

Specifically, a content name corresponding to the original/converted resource response entry is a content name of the original/converted media resource corresponding to the original/converted resource response entry, and may be determined according to the storage path in the original/converted resource response entry. There is no need to convert the original resource response entry, because it is corresponding to the original media resource. Therefore, during the foregoing process, firstly find whether, in the corresponding resource family response entry, there is an identifier of a first display device of one original resource response entry that includes the identifier of the selected display device.

Further, the control device may also recommend an optional display device corresponding to the original media resource to the user according to the original identifier in the original resource response entry. Specifically, the displaying the content name of the at least one media resource and an identifier of at least one display device specifically includes: binding and returning a content name of each resource family response entry and the identifier of the first display device to the user.

Specifically, the identifier of the first display device is included in the original resource entry. The media resource corresponding to the original media resource entry is the original media resource, that is, the first display device is an optional display device capable of playing the original media resource without conversion. Therefore, bind and return the content name of each resource family response entry and the identifier of the first display device to the user, which is convenient for the user to select a proper display device, so as to reduce conversion as much as possible, lighten a burden of a home area network device, and save time spent by the user in waiting for conversion.

This embodiment of the present invention adopts the following technical means: setting a central server that is interactive with a control device, where the control device receives a query response returned by the central server which includes a storage path of each media resource and an identifier of an optional display device, and determines a selected storage path corresponding to a selected content name and a selected display device selected by a user; delivers the selected storage path to the selected display device. This technical means overcomes a deficiency in the prior art that, on a home area network that includes a single MS and a single MR, when a format of a media resource on the MS cannot be played on the MR, and the MS is not capable of converting the format of the media resource into a format that can be played by the MR, the media resource cannot be played; and provides a set of solutions with a plurality of MSs and a plurality of MRs, which may match, by using the central server and the control device, a selected media resource that can be played with a display device selected by the user, thereby greatly enhancing user experience.

The foregoing media playback processing method and media playback control method according to the embodiments of the present invention may have a plurality of application scenarios. The following part further introduces embodiments of the present invention in several application scenarios.

Figure 4A:
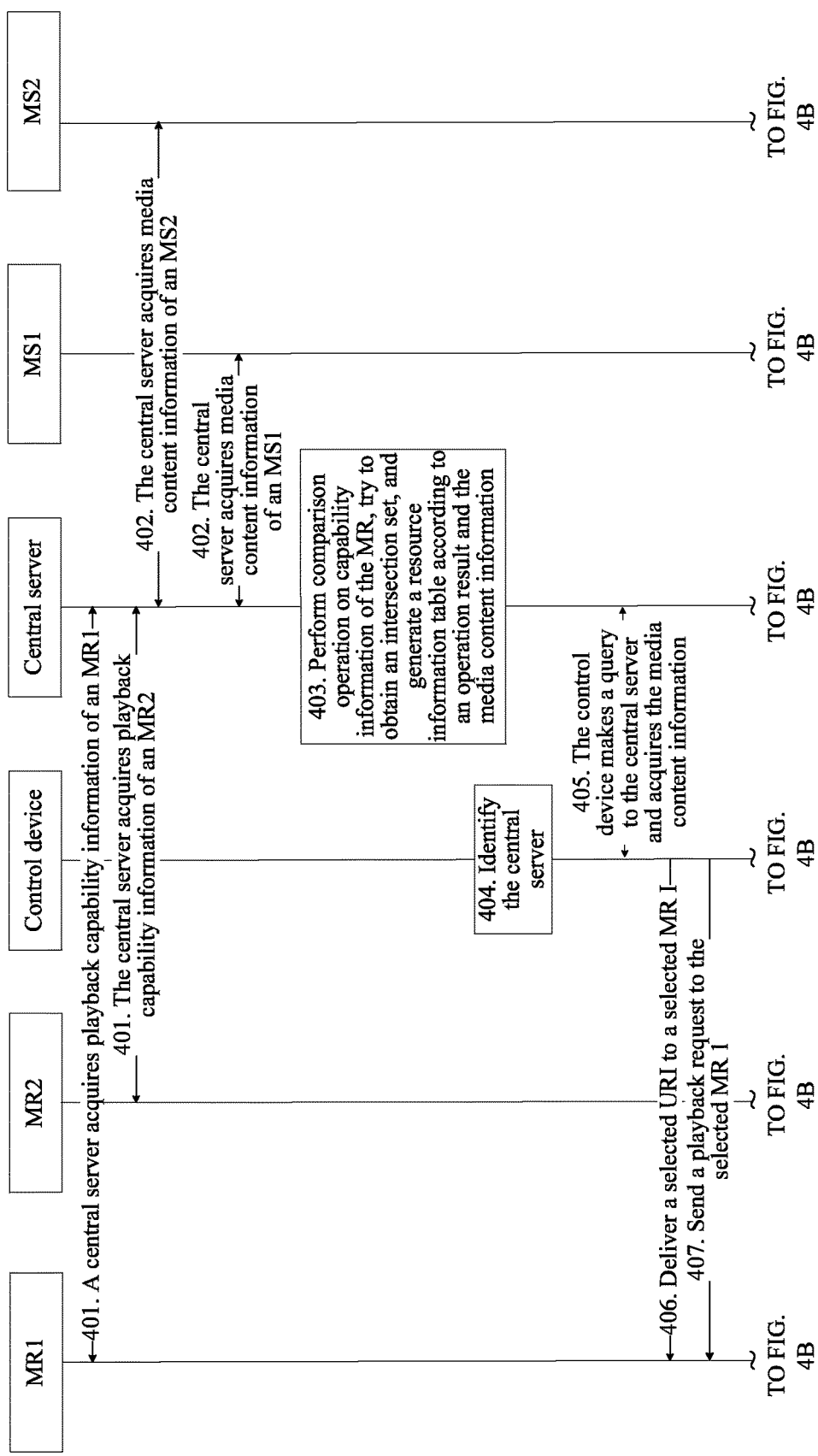
FIG. 4A and FIG. 4B are a schematic signaling diagram of a first application scenario according to an embodiment of the present invention.
Figure 4B:
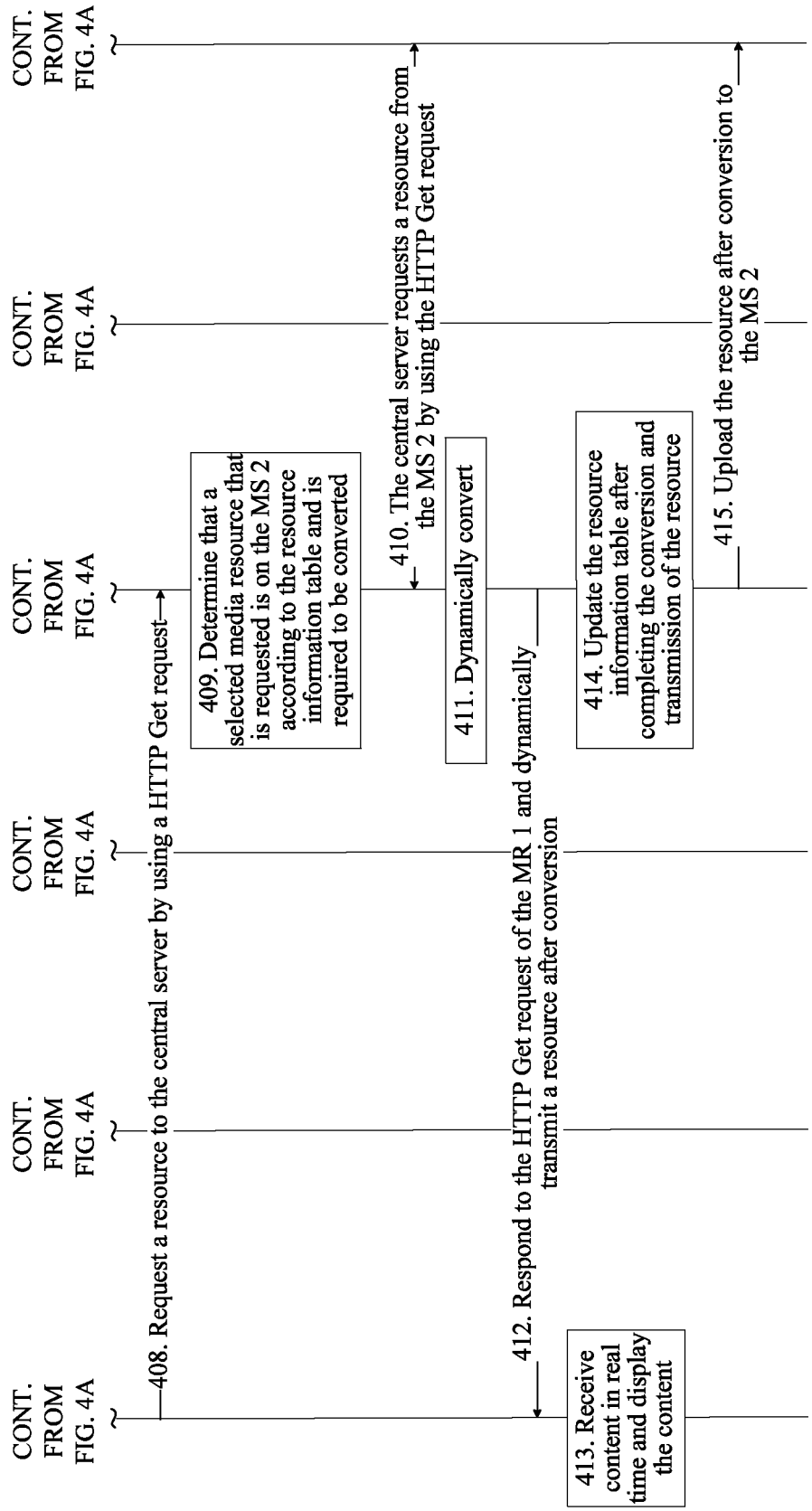

In a first application scenario, a central server provides all types of conversion capabilities, where the central server may be a module embedded in another MS, and a conversion capability of the central server may be extended by upgrading the module, and the another MS has no conversion capability. In addition, it may be considered that the central server includes functions of an MS and a part of functions of a CP. FIG. 4A and FIG. 4B is a schematic signaling diagram of the first application scenario according to an embodiment of the present invention. As shown in FIG. 4A and FIG. 4B, the scenario includes the following processes:

Step 401. A central server acquires playback capability information of an MR.

Specifically, the central server may send a GetProtocolInfo( ) request to the MR on a home area network to acquire the playback capability information of the MR.

Step 402. The central server acquires media content information of the MS.

Specifically, the central server may send a Browse( )/Search( ) request to the MS on the home area network to acquire the media content information of the MS.

The media content information includes a resource identifier, a content size, a URI that includes an absolute path, a media format, and a transport protocol of at least one original media resource.

Step 403. Perform a comparison operation on capability information of the MR, try to obtain an intersection set, and generate a resource information table according to an operation result and the media content information.

The resource information table may be described in an extensible markup language (XML) format and be classified into an original resource entry and a converted resource entry. Each original resource entry and a corresponding converted resource entry are described in one segment of the XML. Further, default may be used as an original identifier, and transcode may be used as a conversion identifier; that is, a resource entry that includes default is the original resource entry, and a resource entry that includes transcode is the converted resource entry.

Step 404. A control device identifies the central server.

Step 405. The control device makes a query to the central server and obtains the media content information.

Specifically, the control device may make a query to the central server by using a Browse( )/Search( ) Action instruction based on a query instruction of a user.

Step 406. The control device delivers a selected URI to a selected MR 1.

Specifically, the control device may deliver the selected URI to the MR 1 by using a SetAVTransportURI( ) request. It is assumed that the selected URI points to the central server.

Step 407. The control service sends a playback request to the selected MR 1.

Step 408. The MR 1 requests a resource from the central server by using an HTTP Get request.

Specifically, before step 408, the MR 1 may establish an HTTP connection with the central server according to a path part in the selected URI.

Step 409. The central server determines that a selected media resource that is requested is on an MS 2 according to the resource information table, and the requested selected media resource is required to be converted.

Herein, it is assumed that the selected media resource is not on the central server but on the MS 2.

In an application, there are several processing manners after the central server receives a resource request.

(1) The selected media resource that is requested is on the central server and is not required to be converted. That is, the selected media resource that is requested is corresponding to the original resource entry, and then the central server directly responds to the HTTP Get request of the MR 1 and transmits the selected media resource to the MR 1.

(2) The selected media resource that is requested is on the central server but is required to be converted. That is, the selected media resource that is requested is corresponding to the converted resource entry, and then the central server responds to the HTTP Get request of the MR 1 in a manner of converting while transmitting, and transmits a selected media resource after conversion to the MR 1.

(3) The selected media resource that is requested is not on the central server and is required to be converted, that is, the selected media resource that is requested is corresponding to the converted resource entry, and then the central server automatically initiates the HTTP Get request to another MS according to a URI in the original resource entry corresponding to the converted resource entry; the another MS responds to the request and send the selected media resource to the central server; then the central server responds to the HTTP Get request of the MR 1 in the manner of converting while transmitting; when converting the selected media resource, the central server locally backs up the selected media resource after conversion.

In addition, in a case in which the selected media resource that is requested is not on the central server but is not required to be converted, a URI of the selected media resource on the another MS is stored in the original resource entry of the resource information table of the central server. Therefore, in step 408, the MR 1 directly requests the resource from the another MS, and the another MS directly responds to the HTTP Get request of the MR 1 and transmits the selected media resource to the MR 1.

Step 410. The central server requests the resource from the MS2 by using the HTTP Get request.

Step 411. The central server dynamically converts the resource.

Step 412. The central server responds to the HTTP Get request of the MR 1 and dynamically transmits a resource after conversion.

Step 413. The MR 1 receives content in real time and displays the content.

Step 414. The central server updates the resource information table after completing the conversion and transmission of the resource.

Specifically, firstly transcode in the converted resource entry corresponding to the selected media resource is changed to default, and an IP address of the central server in the URI is changed to an IP address of the MS 2; then content corresponding to the converted resource entry is shifted into another XML table and serves as a new original resource entry to create a label.

Step 415. The central server uploads the resource after conversion to the MS 2.

Specifically, the central server may send an Import( ) to command the MS 2 to download the selected media resource after conversion to a designated URI on the MS 2. In addition, optionally, the selected media resource after conversion is deleted from the central server after the uploading succeeds.

Figure 5A:
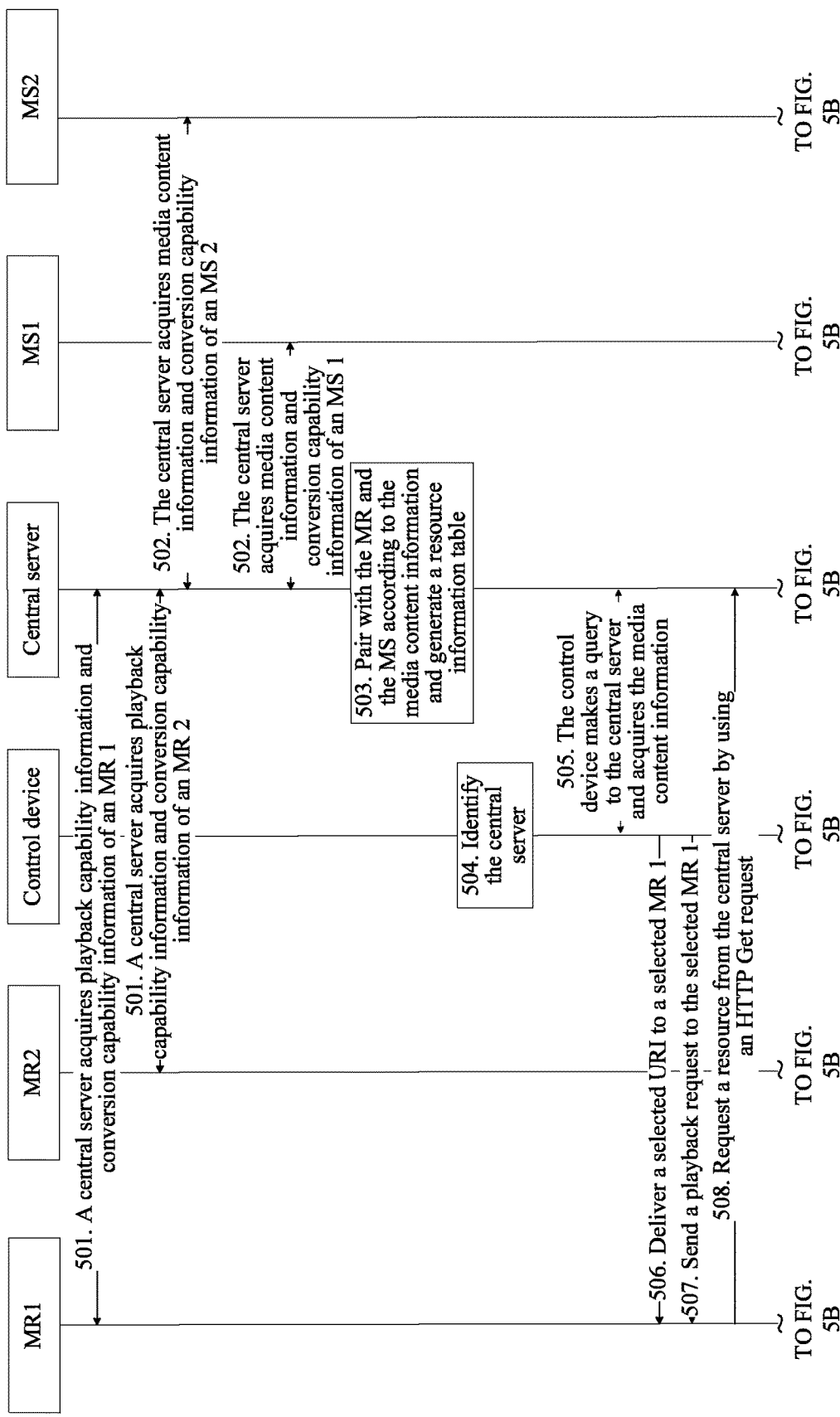
FIG. 5A and FIG. 5B are a schematic signaling diagram of a second application scenario according to an embodiment of the present invention.
Figure 5B:
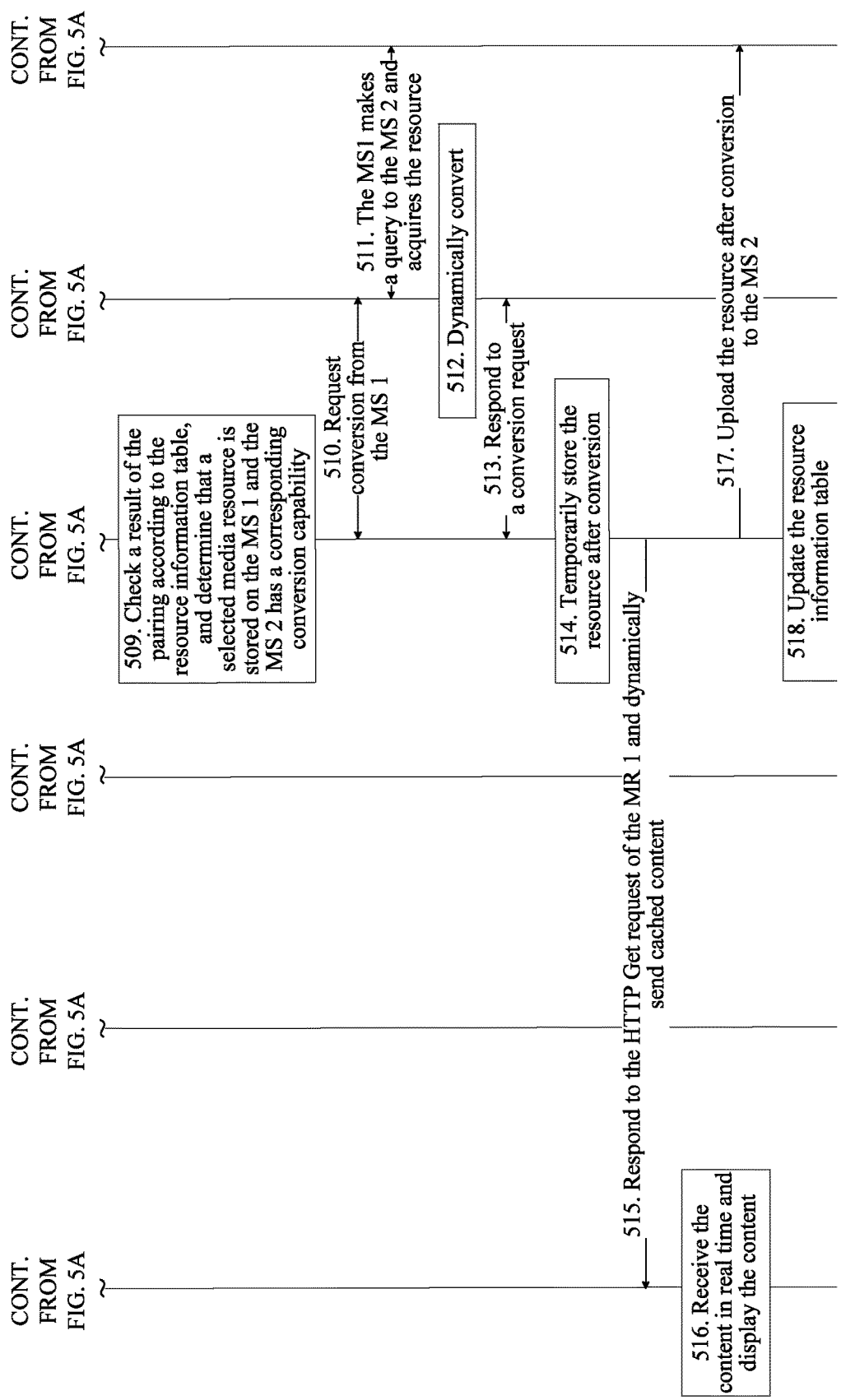

In a second application scenario, a central server has no conversion capability, and the central server may be a module embedded on another MS; an MR and the another MS have the conversion capability; in addition, it may be considered that the central server includes functions of the MS and a part of functions of a CP. FIG. 5A and FIG. 5B is a schematic signaling diagram of the second application scenario according to an embodiment of the present invention. As shown in FIG. 5A and FIG. 5B, the scenario includes the following processes:

Step 501. A central server acquires playback capability information and conversion capability information of an MR.

Specifically, the central server may send a GetProtocolInfo( ) request to the MR on a home area network to acquire the playback capability information and the conversion capability information of the MR.

Step 502. The central server acquires media content information and conversion capability information of an MS.

Specifically, the central server may send a Browse( )/Search( ) request to the MS on the home area network to acquire the media content information and the conversion capability information of the MS.

Step 503. The central server pairs with the MR and the MS according to the media content information and generates a resource information table.

Specifically, the resource information table includes a capability information table, an actual resource entry, and a resource server pairing entry, where the capability information table is shown in Table 2.

TABLE 2

| MR/MS | Conversion capability | Supported media format | Supported resolution | Supported transport protocol |
|---|---|---|---|---|
| MR 1 | MPEG2<->WMV | MPEG4, MPEG2 | 1080p, 720p | HTTP, RTP/RTSP |
| MS 1 | MPEG2<->MPEG4, H.264<->MPEG4 | | | |
| MR 2 | MPEG4<->AVI | MPEG2, AVI, WMV | 720p, 480p | HTTP |
| MS 2 | MPEG2<->AVC, MPEG4<->AVI | | | |
| MR 3 | MPEG4<->AVI | WMV, AVC, H.264 | 720p, 240p | HTTP |

Further, pairing is performed according to the capability information table and the media content information. A pairing rule may be matching according to the media resource information and a conversion capability of the MR/MS and selecting optimal matching. Specifically, the pairing may be performed in the following two steps:

1) Pair a media resource with the MR and generate the actual resource table;

2) Pair the MS with a media resource that cannot be played and converted by the MR, and generate the resource server pairing entry, where the resource server pairing entry includes an absolute URI that points to an actual storage path of the media resource and an absolute URI after conversion, and the absolute URI after conversion points to an MS with a corresponding conversion capability.

Step 504. A control device identifies the central server.

Step 505. The control device makes a query to the central server and obtains the media content information.

Specifically, the control device may make a query to the central server by using a Browse( )/Search( ) Action instruction based on a query instruction of users. The central server performs the foregoing pairing; therefore, the pairing information may be added to information returned by the control device, so as to enable the users to select desired media content in the control device; the control device may recommend an MR to the users, and if there is no MR to recommend, the users may select one by themselves.

Step 506. The control device delivers a selected URI to a selected MR 1.

Specifically, the selected URI may be delivered by using a SetAVTransportURI( ) request. It is assumed that the selected URI points to the central server.

Step 507. The control service delivers a playback request to the selected MR 1.

Step 508. The MR 1 requests a resource from the central server by using an HTTP Get request.

Step 509. The central server checks a pairing result according to the resource information table, and determines that the selected media resource is stored on the MS 1 and the MS 2 has a corresponding conversion capability.

In step 508, the HTTP Get request sent by the MR 1 carries a path part of the selected URI. In step 509, the central server checks whether the selected URI is paired with the MR 1, that is, whether there is an actual resource entry that includes an identifier of the selected URI and an identifier of the MR 1. Assuming that the pairing fails, it is determined that the selected media resource is stored on the MS 1 according to the resource server pairing entry, and the MS 2 has the corresponding conversion capability.

Step 510. The central server requests conversion from the MS 1.

Specifically, the central server requests conversion from the MS 1 by using a SetTransform( ) Action command. Parameters of SetTransform( ) Action are as follows:

| Parameters | Direction | Description |
| --- | --- | --- |
| SourceURI | IN | Absolute URI of a source file |
| Transcode | IN | Object file format after conversion |
| DesURI | IN | Absolute URI of an object file after conversion |

Step 511. The MS 1 makes a request to the MS 2 and obtains the resource.

Specifically, the MS 1 requests the selected media resource from the MS 2 according to a parameter SourceURI of SetTransform( ) Action.

Step 512. The MS 1 performs dynamical conversion.

Specifically, the MS 1 determines, according to a parameter Transcode of Set Transform( ) Action, a media format into which the selected media resource is converted, and stores a selected media resource after conversion in a position indicated by a parameter DesURI.

Step 513. The MS 1 responds to a conversion request of the central server.

Specifically, the MS 1 sends the resource after conversion to the central server.

Step 514. The central server temporarily stores the resource after conversion.

Step 515. The central server responds to the HTTP Get request of the MR 1 and dynamically transmits temporarily stored content.

Step 516. The MR 1 receives the content in real time and displays the content.

Step 517. The central server uploads the resource after conversion to the MS 2.

Specifically, the central server requests CreateObject( ) Action from the MS 2; then a CP on the central server sends Import ( ) Action to the central server and requests the MS 2 to download the resource after conversion from the central server and store the resource after conversion.

Step 518. The central server updates the resource information table.

Figure 6A:
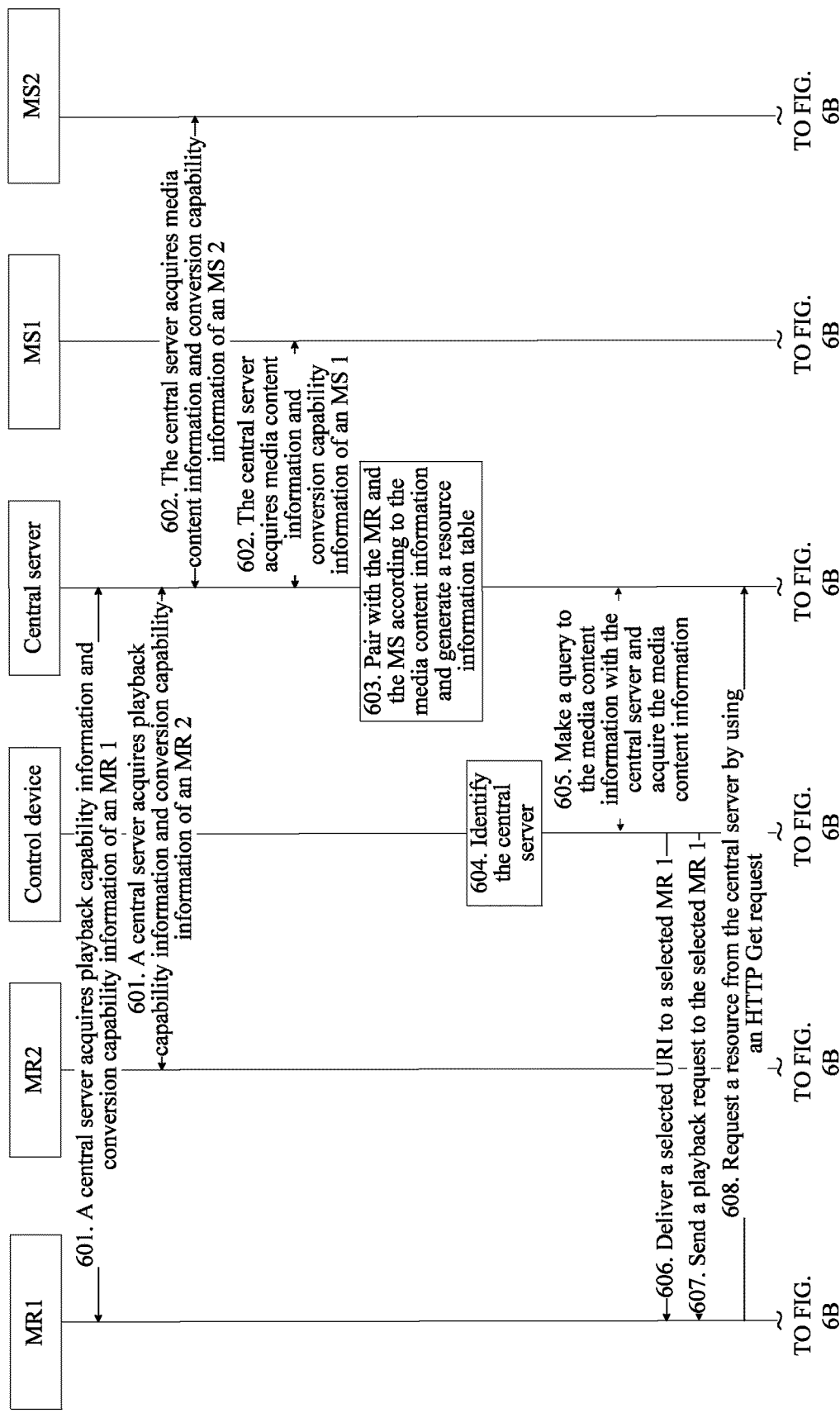
FIG. 6A and FIG. 6B are a schematic signaling diagram of a third application scenario according to an embodiment of the present invention.
Figure 6B:
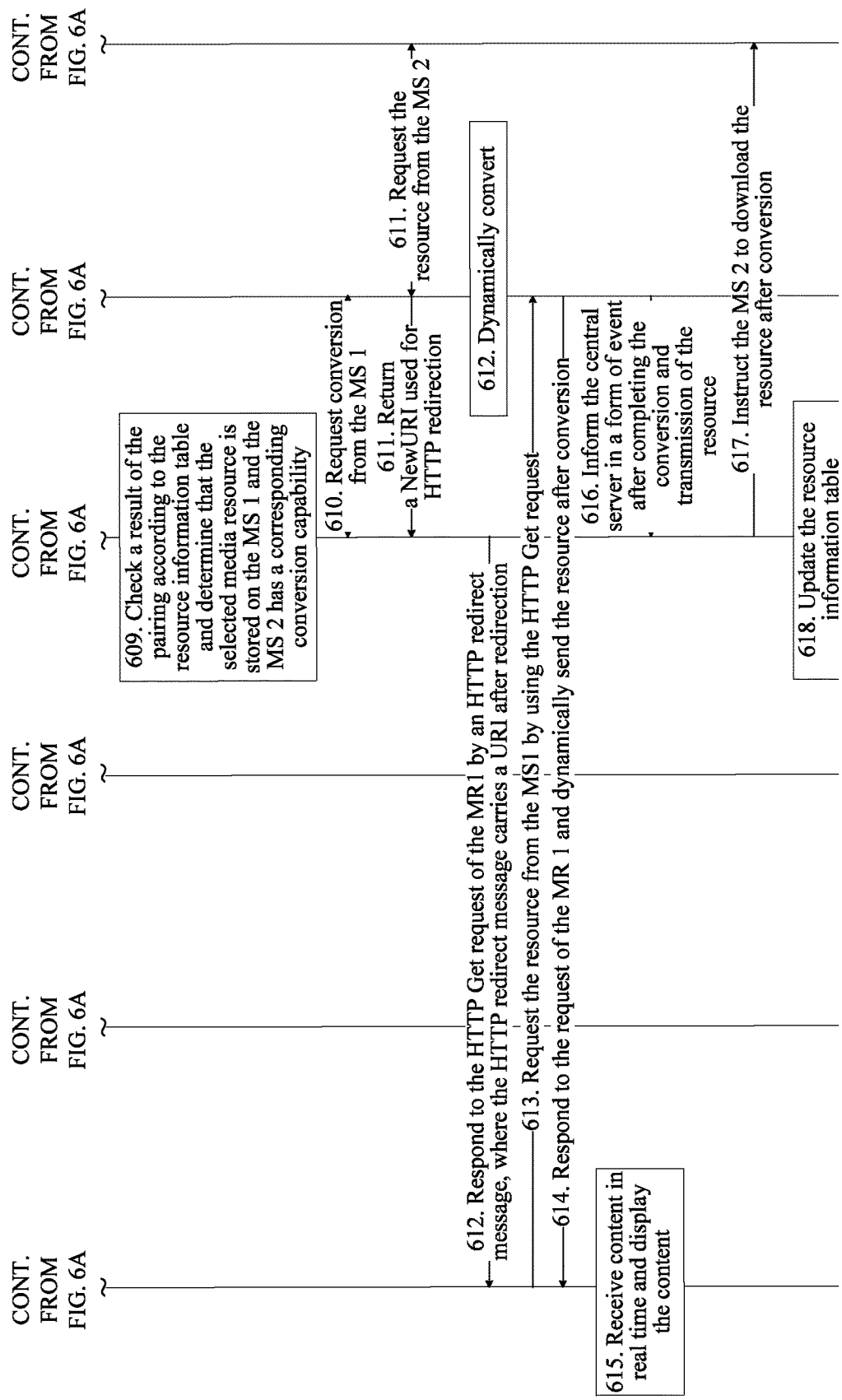

A third application scenario is similar to the second application scenario. A central server has no conversion capability, and the central server may be a module embedded on another MS; an MR and the another MS have the conversion capability; in addition, it may be considered that the central server includes functions of an MS and a part of functions of a CP. FIG. 6A and FIG. 6B is a schematic signaling diagram of the third application scenario according to an embodiment of the present invention. As shown in FIG. 6A and FIG. 6B, the scenario includes the following processes:

Step 601. A central server acquires playback capability information and conversion capability information of an MR.

Specifically, the central server may send a GetProtocolInfo( ) request to the MR on a home area network to acquire the playback capability information and the conversion capability of the MR.

Step 602. The central server acquires media content information and conversion capability information of MSs. Specifically, the central server may send a Browse( )/Search( ) request to the MSs on the home area network to acquire the media content information and the conversion capability information of the MSs.

Step 603. The central server pairs with the MR and the MS according to the media content information and generates a resource information table.

Step 604. A control device identifies the central server.

Step 605. The control device makes a query to the central server and obtains the media content information.

Step 606. The control device delivers a selected URI to a selected MR 1.

Specifically, the control device delivers the selected URI by using a SetAVTransportURI( ) request. It is assumed that the selected URI points to the central server.

Step 607. The control device delivers a playback request to the selected MR 1.

Step 608. The MR 1 requests a resource from the central server by using an HTTP Get request.

Step 609. The central server checks a pairing result according to the resource information table, and determines that the selected media resource is stored on the MS 1 and the MS 2 has a corresponding conversion capability.

Step 610. The central server requests conversion from the MS 1.

For an implementation process of steps 601 to 610, refer to steps 501 to 510.

Step 611. The MS 1 returns a NewURI used for HTTP redirection to the central server and requests the resource from the MS 2.

Specifically, the MS 1 requests the selected media resource from the MS 1 according to a parameter SourceURI of SetTransform( ) Action.

Step 612. The central server responds to the HTTP Get request of the MR 1 by using an HTTP redirect message, where the HTTP redirect message carries a URI after redirection, and meanwhile, the MS 1 performs dynamical conversion.

Specifically, the central server determines an actual URI of the selected media resource according to the resource information table and returns the actual URI to the MR 1. The MS 1 determines, according to a parameter Transcode of Set Transform( ) Action, a media format into which the selected media resource is converted, and stores a selected media resource after conversion in a position indicated by a parameter DesURI.

Step 613. The MR 1 requests the resource from the MS 1 by using the HTTP Get request.

Specifically, the MR 1 requests the resource from the MS 1 according to the actual URI returned by the central server.

Step 614. The MS 1 responds to the request of the MR 1 and dynamically transmits the resource after conversion.

Step 615. The MR 1 receives content in real time and displays the content.

Step 616. The MS 1 informs the central server in a form of an event after completing the conversion and transmission of the resource.

Step 617. The central server instructs the MS 2 to download the resource after conversion.

Specifically, a CP on the central server requests CreateObject( ) Action form the MS 2; then the CP on the central server sends an Import( ) to command the MS 2 to download the resource after conversion from the MS 1.

Step 618. The central server updates the resource information table.

Specifically, the central server receives a returned value of the Import( ) Action command, where the returned value is sent by the MS 2, and determines that the MS 2 updates the resource information table after the downloading succeeds.

In addition, in the foregoing application scenario, the control device and the central server may be set as a whole.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (ROM), a random-access memory (RAM), a magnetic disk, or an optical disc.

Figure 7:
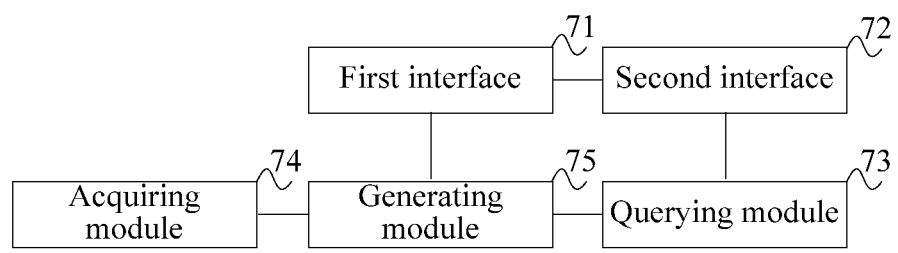
FIG. 7 is a schematic structural diagram of a central server according to Embodiment 4 of the present invention.

FIG. 7 is a schematic structural diagram of a central server according to Embodiment 4 of the present invention. As shown in FIG. 7, the central server includes: a first interface 71 configured to receive a query request of a control device and return a query response to the control device according to a pre-generated resource information table, where the query response includes a storage path of at least one media resource; a second interface 72 configured to receive a resource request of a selected display device selected by the control device, where the resource request includes information about a selected storage path; and a querying module 73 configured to query the resource information table, determine that a selected media resource corresponding to the information about the selected storage path is stored on a first media server, and determine a second media server with a conversion capability to convert a media format of the selected media resource into a media format supported by a playback capability of the selected display device, so as to enable the selected display device to play a media resource converted by the second media server from the selected media resource.

In an optional embodiment of the present invention, the central server further includes: an acquiring module 74 configured to acquire playback capability information of at least one display device that includes the selected display device as well as media content information and conversion capability information of a plurality of media servers that include the central server, the first media server, and the second media server; and a generating module 75 configured to generate the resource information table according to the playback capability information of the at least one display device as well as the media content information and conversion capability information of the plurality of media servers, where the resource information table includes a resource identifier, a media format, and a storage path of at least one media resource.

In another optional embodiment of the present invention, the resource information table includes an original resource entry and a converted resource entry, and the generating module 75 specifically includes: an intersection set determining unit configured to determine a playback capability intersection set according to the playback capability information of the at least one display device, where a playback capability of each display device supports at least one media format in the playback capability intersection set; an original entry unit configured to determine an original media resource according to the media content information of the plurality of media servers and generate the original resource entry, where the original resource entry includes an original identifier as well as a resource identifier, a media format, and a storage path of the original media resource, and the storage path of the original media resource points to the first media server that stores the original media resource; and a converted entry unit configured to determine, according to a media format that is in the playback capability intersection set and is different from the media format of the original media resource, a converted media resource corresponding to the original media resource, generate a converted resource entry corresponding to the original resource entry, where the converted resource entry includes a conversion identifier as well as a resource identifier, a media format, and a storage path of the converted media resource, and the storage path of the converted media resource points to the central server, and establish a correspondence between the converted resource entry and a media server with a conversion capability to convert the media format of the original media resource into the media format of the converted media resource, where the media format of the converted media resource is different from the media format of the corresponding original media resource, and the media format of the converted media resource is in the playback capability intersection set.

In still another optional embodiment of the present invention, the first interface 71 is specifically configured to: query the resource information table according to a query condition included in the query request; determine an original resource entry that meets the query condition, and add a corresponding original resource response entry to the query response, where the original resource response entry includes the original identifier and the storage path of the original media resource that are in the original resource entry; and determine a converted resource entry that meets the query condition, and add a corresponding converted resource response entry to the query response, where the converted resource response entry includes the conversion identifier and the storage path of the converted media resource that are in the converted resource entry.

In still another optional embodiment of the present invention, the querying module 73 is specifically configured to: find a converted resource entry that includes the selected storage path according to the information about the selected storage path in the resource request; and determine an original resource entry corresponding to the converted resource entry that includes the selected storage path, determine a first media server to which a storage path in the corresponding original resource entry points, and determine a second media server corresponding to the converted resource entry that includes the selected storage path.

In still another optional embodiment of the present invention, the original resource entry further includes an identifier of a first display device, where a playback capability of the first display device supports the media format in the original resource entry; and the converted resource entry further includes an identifier of a second display device, where a playback capability of the second display device supports the media format in the converted resource entry.

The corresponding original resource response entry further includes the identifier of the first display device in the original resource entry; and the corresponding converted resource response entry further includes the identifier of the second display device in the converted resource entry.

In still another optional embodiment of the present invention, the acquiring module 74 is further configured to: acquire conversion capability information of the at least one display device; and determine a comprehensive playback capability of each display device according to the playback capability information and the conversion capability information of the at least one display device.

The generating module 75 is specifically configured to: generate the resource information table according to the playback capability information and the conversion capability information of the at least one display device as well as the media content information and the conversion capability information of the plurality of media servers, where the resource information table includes a resource identifier, a media format, and a storage path of at least one media resource and an identifier of an optional display device, and a comprehensive playback capability of the optional display device supports the media format.

Further, the intersection set determining unit is specifically configured to: determine the playback capability intersection set according to the playback capability information and the conversion capability information of the at least one display device, where a comprehensive playback capability of each display device supports at least one media format in the playback capability intersection set.

In still another optional embodiment of the present invention, the querying module 73 is further configured to: if the central server is the second media server, acquire the selected media resource from the first media server, convert the selected media resource, obtain a selected media resource after conversion, and send the selected media resource after conversion to the selected display device; or the querying module 73 is further configured to: if the central server is not the second media server, redirect the resource request to the second media server, so as to enable the second media server to acquire the selected media resource from the first media server, convert the selected media resource, obtain a selected media resource after conversion, and send the selected media resource after conversion to the selected display device; or the querying module 73 is further configured to: if the central server is not the second media server, instruct the second media server to acquire the selected media resource from the first media server, so as to enable the second media server to convert the selected media resource and return a selected media resource after conversion to the central server; and configured to send the selected media resource after conversion to the selected display device.

In still another optional embodiment of the present invention, the central server further includes: a downloading module configured to download the selected media resource after conversion from the second media server if the central server is the first media server; a second instructing module configured to instruct the first media server to download the selected media resource after conversion from the second media server or the central server if the central server is not the first media server; and an updating module configured to update the resource information table according to the selected media resource after conversion.

For specific implementation of this embodiment, refer to the media playback processing method according to Embodiment 1 of the present invention. This embodiment of the present invention adopts the following technical means: setting a central server, where the central server returns a query response to a control device according to a pre-generated resource information table, queries the resource information table according to a resource request of a selected display device, determines that a selected media resource corresponding to information about a selected storage path in the resource request is stored on a first media server, and determines a second media server with a conversion capability to convert a media format of the selected media resource into a media format supported by a playback capability of the selected display device, so as to enable the selected display device to play a media resource converted by the second media server from the selected media resource. This technical means overcomes a deficiency in the prior art that, on a home area network that includes a single MS and a single MR, when a format of a media resource on the MS cannot be played on the MR, and the MS is not capable of converting the format of the media resource into a format that can be played by the MR, the media resource cannot be played; and provides a set of solutions with a plurality of MSs that may coordinate media resources and conversion capabilities of the plurality of MSs, so as to adapt to the playback capability of the selected display device, thereby greatly enhancing user experience.

Figure 8:
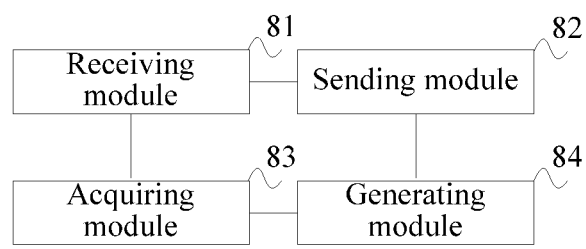
FIG. 8 is a schematic structural diagram of a central server according to Embodiment 5 of the present invention.

FIG. 8 is a schematic structural diagram of a central server according to Embodiment 5 of the present invention. As shown in FIG. 8, the central server includes: a receiving module 81 configured to receive a query request of a control device; and a sending module 82 configured to return a query response to the control device according to a pre-generated resource information table, where the query response includes a storage path of at least one media resource and an identifier of an optional display device, and a playback capability of the optional display device supports a media format of the media resource, so as to enable the control device to select one media resource and one optional display device of the media resource to play the media resource.

In an optional embodiment of the present invention, the central server further includes: an acquiring module 83 configured to acquire playback capability information of a plurality of display devices as well as media content information and conversion capability information of at least one media server that includes the central server; and a generating module 84 configured to generate the resource information table according to the playback capability information of the plurality of display devices as well as the media content information and the conversion capability information of the at least one media server, where the resource information table includes a resource identifier, a media format, and a storage path of at least one media resource and the identifier of the optional display device, and the playback capability of the optional display device supports the media format.

In another optional embodiment of the present invention, the acquiring module 83 is specifically configured to: acquire conversion capability information of the plurality of display devices; and determine a comprehensive playback capability of each display device according to the playback capability information and the conversion capability information of the plurality of display devices.

The generating module 84 is specifically configured to: generate the resource information table according to the playback capability information and the conversion capability information of the plurality of display devices as well as the media content information and the conversion capability information of the at least one media server, where the resource information table includes the resource identifier, the media format, and the storage path of the at least one media resource and the identifier of the optional display device, and the comprehensive playback capability of the optional display device supports the media format.

In still another optional embodiment of the present invention, the generating module 84 is further configured to: before the returning a query response to the control device according to a pre-generated resource information table, return a pre-query response to the control device according to the pre-generated resource information table, where the pre-query response includes a storage path of at least one media resource; receive a selected request of the control device, where the selected request includes a selected content name; determine a storage path of at least one media resource corresponding to the selected content name as well as the identifier of the optional display device according to the resource information table, where the playback capability of the optional display device supports a media format of the media resource; and bind and add the storage path of the at least one media resource corresponding to the selected content name as well as the identifier of the optional display device to the query response.

For specific implementation of this embodiment, refer to the media playback processing method according to Embodiment 2 of the present invention. This embodiment of the present invention adopts the following technical means: setting a central server, where the central server returns a query response to a control device according to a pre-generated resource information table; and adds a storage path of a media resource and an identifier of an optional display device to the query response, so as to enable the control device to recommend a display device that is suitable for a selected media resource to a user according to the query response. This technical means overcomes a deficiency in the prior art that, on a home area network that includes a single MS and a single MR, when a format of a media resource on the MS cannot be played on the MR, and the MS is not capable of converting the format of the media resource into a format that can be played by the MR, the media resource cannot be played; and provides a set of solutions with a plurality of MRs that can recommend an MR that is capable of playing the selected media resource to the user by using the central server and the control device, thereby greatly enhancing user experience.

It should be noted that all the central servers in the embodiments of the present invention may be implemented by combining software and hardware. Specifically, a central server includes a processor, a memory, and a communications module that interacts with a control device, where the memory stores code that is used to implement functions of each foregoing module/unit; the processor is configured to execute the code stored in the memory; and the communications module may be any wired or wireless communications module, such as an Ethernet communications module, a radio frequency communications module, a Bluetooth communications module, or a general packet radio service (GPRS) communications module.

Figure 9:
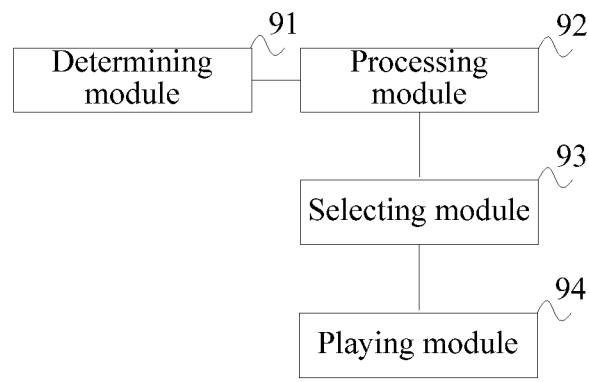
FIG. 9 is a schematic structural diagram of a control device according to Embodiment 6 of the present invention.

FIG. 9 is a schematic structural diagram of a control device according to Embodiment 6 of the present invention. As shown in FIG. 9, the control device includes: a determining module 91 configured to determine a query condition and send a query request that includes the query condition to a central server; a processing module 92 configured to receive a query response returned by the central server and determine a selected content name as well as an identifier of a selected display device according to a selection instruction, where the query response includes a storage path of at least one media resource and an identifier of an optional display device, and the storage path points to one of at least one media server that includes the central server; a selecting module 93 configured to determine, from the storage path of the at least one media resource, a selected storage path corresponding to the selected content name as well as the identifier of the selected display device, where the selected storage path includes the selected content name, and send the selected storage path to the selected display device; and a playing module 94 configured to send a playback request to the selected display device, so as to enable the selected display device to acquire a media resource from the at least one media server according to the selected storage path and play the media resource.

In an optional embodiment of the present invention, the control device further includes: an identifying module configured to identify at least one display device and the at least one media server, and identify the central server from the at least one media server.

In another optional embodiment of the present invention, the processing module 92 is specifically configured to: receive the query response; determine a content name of the at least one media resource according to the storage path of the at least one media resource, and display the content name of the at least one media resource and an identifier of the at least one display device; and receive a double selection instruction, where the double selection instruction includes the selected content name as well as the identifier of the selected display device, and the selected content name is one of the content name of the at least one media resource.

In another optional embodiment of the present invention, the processing module 92 is specifically configured to: receive a pre-query response returned by the central server, where the pre-query response includes a storage path of at least one media resource, and the storage path points to one of the at least one media server that includes the central server; determine the content name of the at least one media resource according to the storage path of the at least one media resource, and display the content name of the at least one media resource; receive a first single selection instruction, where the first single selection instruction includes the selected content name, and the selected content name is one of the content name of the at least one media resource; send a selected request that includes the selected content name to the central server; and receive the query response returned by the central server, where the query response includes the storage path of the at least one media resource corresponding to the selected content name as well as the identifier of the optional display device, where the storage path of the at least one media resource includes the selected content name.

The selecting module 93 is specifically configured to: receive a second single selection instruction, where the second single selection instruction includes the identifier of the selected display device; and determine, from the storage path of the at least one media resource corresponding to the selected content name, the selected storage path corresponding to the identifier of the selected display device.

In another optional embodiment of the present invention, the query response includes an original resource response entry and a converted resource response entry, where the original resource response entry includes an original identifier, a storage path of an original media resource, and an identifier of a first display device, and the converted resource response entry includes a conversion identifier, a storage path of a converted media resource, and an identifier of a second display device.

The processing module 92 is specifically configured to: determine content names corresponding to the original resource response entry and those corresponding to the converted resource response entry; and determine at least one resource family response entry, where the resource family response entry includes an original resource response entry and a converted resource response entry corresponding to a same content name, and display a content name of each resource family response.

The selecting module 93 is specifically configured to: determine a resource family response entry corresponding to the selected content name; if the original resource response entry that includes the identifier of the selected display device exists in the corresponding resource family response entry, determine that a storage path in the original resource response entry is the selected storage path; and if the original resource response entry that includes the identifier of the selected display device does not exist in the corresponding resource family response entry, but the converted resource response entry that includes the identifier of the selected display device exists in the corresponding resource family response entry, determine that a storage path in the converted resource response entry is the selected storage path.

In another optional embodiment of the present invention, the processing module 92 is specifically configured to: bind and display the content name of each resource family response entry and the identifier of the first display device.

For specific implementation of this embodiment, refer to the media playback control method according to Embodiment 3 of the present invention. This embodiment of the present invention adopts the following technical means: setting a central server that is interactive with a control device, where the control device receives a query response returned by the central server which includes a storage path of each media resource and an identifier of an optional display device, and determines a selected storage path corresponding to a selected content name and a selected display device selected by a user; delivers the selected storage path to the selected display device. This technical means overcomes a deficiency in the prior art that, on a home area network that includes a single MS and a single MR, when a format of a media resource on the MS cannot be played on the MR, and the MS is not capable of converting the format of the media resource into a format that can be played by the MR, the media resource cannot be played; and provides a set of solutions with a plurality of MSs and a plurality of MRs, which may match, by using the central server and the control device, a display device selected the user with a media resource that can be played, thereby greatly enhancing user experience.

It should be noted that the control device in this embodiment of the present invention may be implemented by combining software and hardware. Specifically, the control device may include a processor, a memory, and a communications module that interacts with the central server, where the memory stores code used to implement functions of each foregoing module/unit; the processor is configured to execute the code stored in the memory; and the communications module may be any wired or wireless communications module, such as an Ethernet communications module, a radio frequency communications module, a Bluetooth communications module, or a GPRS communications module. In addition, the control device may also be designed in a form similar to an existing remote control.

Figure 10:
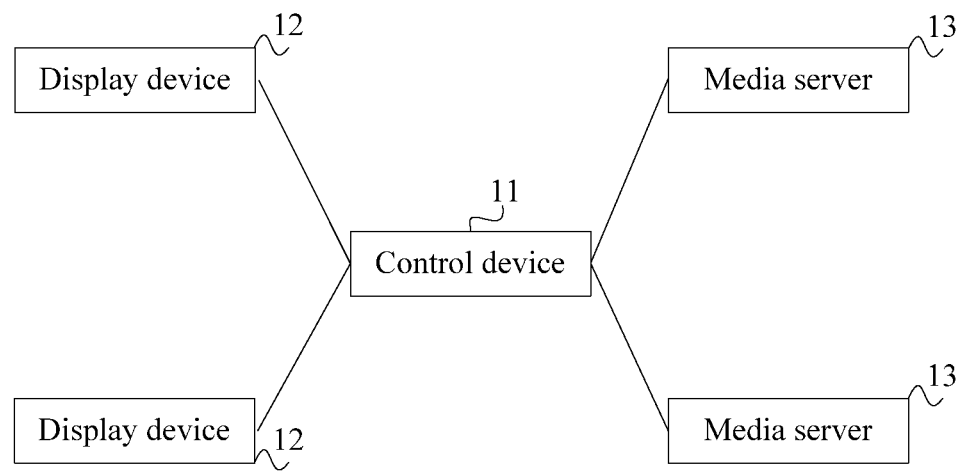
FIG. 10 is a schematic structural diagram of a media playback processing and control system according to Embodiment 7 of the present invention.

FIG. 10 is a schematic structural diagram of a media playback processing and control system according to Embodiment 7 of the present invention. As shown in FIG. 10, the system includes: a control device 11, at least one display device 12, and at least one media server 13, and a media server 13 in the at least one media server may be the central server as described in Embodiment 4 of the present invention.

Further, the control device 11 may be the control device as described in Embodiment 6 of the present invention.

Further, the control device and the central server may be set as a whole.

This embodiment of the present invention adopts the following technical means: setting a central server, where the central server returns a query response to a control device according to a pre-generated resource information table, instructs a second media server to acquire a selected media resource from a first media server according to a resource request of a selected display device, converts the selected media resource, and sends a selected media resource after conversion to the selected display device. This technical means may coordinate media resources and conversion capabilities of a plurality of MSs to adapt to a playback capability of the selected display device; or add a storage path of a media resource and an identifier of an optional display device to the query response, so as to enable the control device to recommend a display device that is suitable for the selected media resource to a user according to the query response, thereby greatly enhancing user experience.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A media playback processing method, comprising:
receiving, by a central server, a query request of a control device;
returning a query response to the control device according to a pre-generated resource information table, wherein the query response comprises a storage path of at least one media resource;
receiving a resource request of a selected display device selected by the control device, wherein the resource request comprises information about a selected storage path;
querying the resource information table;
determining that a selected media resource corresponding to the information about the selected storage path is stored on a first media server; and
determining a second media server with a conversion capability to convert a media format of the selected media resource into a media format supported by a playback capability of the selected display device to enable the selected display device to play a media resource converted by the second media server from the selected media resource,
wherein before receiving, by the central server, the query request of the control device, the method further comprises:

acquiring, by the central server, playback capability information of at least one display device that comprises the selected display device, as well as media content information and conversion capability information of a plurality of media servers that comprise the first media server and the second media server; and generating the resource information table according to the playback capability information of the at least one display device as well as the media content information and the conversion capability information of the plurality of media servers, wherein the resource information table comprises a resource identifier, a media format, and a storage path of at least one media resource, wherein the resource information table comprises an original resource entry and a converted resource entry, and wherein generating the resource information table according to the playback capability information of the at least one display device as well as the media content information and the conversion capability information of the plurality of media servers comprises:

determining a playback capability intersection set according to the playback capability information of the at least one display device, wherein a playback capability of each display device supports at least one media format in the playback capability intersection set;

determining an original media resource according to the media content information of the plurality of media servers;

generating the original resource entry, wherein the original resource entry comprises an original identifier well as a resource identifier, a media format, and a storage path of the original media resource, and the storage path of the original media resource points to a media server that stores the original media resource; and determining, according to a media format that is in the playback capability intersection set and is different from the media format of the original media resource, a converted media resource corresponding to the original media resource; and generating the converted resource entry corresponding to the original resource entry, wherein the converted resource entry comprises a conversion identifier as well as a resource identifier, a media format, and a storage path of the converted media resource, and the storage path of the converted media resource points to the central server, and establishing a correspondence between the converted resource entry and a media server with a conversion capability to convert the media format of the original media resource into the media format of the converted media resource, and wherein the media format of the converted media resource is different from the media format of the corresponding original media resource, and the media format of the converted media resource is in the playback capability intersection set.

2. The method according to claim 1, wherein determining, according to the media format that is in the playback capability intersection set and is different from the media format of the original media resource, the converted media resource corresponding to the original media resource, and generating the converted resource entry corresponding to the original resource entry comprises:

determining N converted media resources corresponding to the original media resource;

generating N converted resource entries corresponding to the original resource entry when the playback capability intersection set comprises N media formats and the media format of the original media resource is not in the playback capability intersection set, and N is a natural number that is greater than or equal to two, wherein the N converted resource entries comprise the N media formats; and determining (N−1) converted media resources corresponding to the original media resource; and generating (N−1) converted resource entries corresponding to the original resource entry when the playback capability intersection set comprises N media formats and the media format of the original media resource is in the playback capability intersection set, and N is a natural number that is greater than or equal to two, wherein the (N−1) converted resource entries separately comprise all media formats in the N media formats except the media format of the original media resource.

3. The method according to claim 1, wherein before returning the query response to the control device according to the pre-generated resource information table, the method further comprises:

querying, by the central server, the resource information table according to a query condition comprised in the query request;

determining an original resource entry that meets the query condition;

adding a corresponding original resource response entry to the query response, wherein the original resource response entry comprises the original identifier and the storage path of the original media resource that are in the original resource entry;

determining a converted resource entry that meets the query condition; and adding a corresponding converted resource response entry to the query response, wherein the converted resource response entry comprises the conversion identifier and the storage path of the converted media resource that are in the converted resource entry.

4. The method according to claim 3, wherein querying, by the central server, the resource information table according to the query condition comprised in the query request further comprises:

finding a converted resource entry that comprises the selected storage path according to the information about the selected storage path in the resource request; and determining an original resource entry corresponding to the converted resource entry that comprises the selected storage path;

determining the first media server to which a storage path in the corresponding original resource entry points; and determining the second media server corresponding to the converted resource entry that comprises the selected storage path.

5. The method according to claim 3, wherein the original resource entry further comprises an identifier of a first display device, wherein a playback capability of the first display device supports the media format in the original resource entry, wherein the converted resource entry further comprises an identifier of a second display device, and wherein a playback capability of the second display device supports the media format in the converted resource entry.

6. The method according to claim 5, wherein the corresponding original resource response entry further comprises the identifier of the first display device in the original resource entry, and wherein the corresponding converted resource response entry further comprises the identifier of the second display device in the converted resource entry.

7. The method according to claim 5, wherein before generating the resource information table according to the playback capability information of the at least one display device as well as the media content information and the conversion capability information of the plurality of media servers, the method further comprises:
   acquiring, by the central server, conversion capability information of the at least one display device;
   determining a comprehensive playback capability of each display device according to the playback capability information and the conversion capability information of the at least one display device,
   wherein generating the resource information table according to the playback capability information of the at least one display device as well as the media content information and the conversion capability information of the plurality of media servers comprises generating the resource information table according to the playback capability information and the conversion capability information of the at least one display device as well as the media content information and the conversion capability information of the plurality of media servers, wherein the resource information table comprises the resource identifier, the media format, and the storage path of the at least one media resource and an identifier of an optional display device; and
   wherein a comprehensive playback capability of the optional display device supports the media format.

8. The method according to claim 7, wherein determining the playback capability intersection set according to the playback capability information of the at least one display device, wherein the playback capability of each display device supports at least one media format in the playback capability intersection set comprises determining the playback capability intersection set according to the playback capability information and the conversion capability information of the at least one display device, wherein the comprehensive playback capability of each display device supports at least one media format in the playback capability intersection set.

9. The method according to claim 1, wherein after determining that the selected media resource corresponding to the information about the selected storage path is stored on the first media server, and determining the second media server with the conversion capability to convert the media format of the selected media resource into the media format supported by the playback capability of the selected display device, the method further comprises:
   acquiring, by the central server, the selected media resource from the first media server when the central server is the second media server;
   converting the selected media resource to obtain a selected media resource after conversion;
   sending the selected media resource after conversion to the selected display device;
   redirecting, by the central server, the resource request to the second media server when the central server is not the second media server to enable the second media server to acquire the selected media resource from the first media server, convert the selected media resource to obtain a selected media resource after conversion, and send the selected media resource after conversion to the selected display device;
   instructing, by the central server, the second media server to acquire the selected media resource from the first media server when the central server is not the second media server to enable the second media server to convert the selected media resource and return a selected media resource after conversion to the central server; and
   sending, by the central server, the selected media resource after conversion to the selected display device.

10. The method according to claim 9, wherein after converting the selected media resource, the method further comprises:
    downloading, by the central server, the selected media resource after conversion from the second media server when the central server is the first media server;
    instructing, by the central server, the first media server to download the selected media resource after conversion from the central server or the second media server when the central server is not the first media server; and
    updating, by the central server, the resource information table according to the selected media resource after conversion.

11. The method according to claim 10, wherein updating, by the central server, the resource information table according to the selected media resource after conversion comprises:
    setting, by the central server, the selected media resource after conversion to be the original media resource;
    updating the original resource entry and the converted resource entry.

12. A media playback control method, comprising:
    determining, by a control device, a query condition;
    sending a query request that comprises the query condition to a central server;
    receiving a query response returned by the central server;
    determining a selected content name as well as an identifier of a selected display device according to a selection instruction, wherein the query response comprises a storage path of at least one media resource and an identifier of an optional display device, and the storage path points to one of at least one media server that comprises the central server;
    determining, from the storage path of the at least one media resource, a selected storage path corresponding to the selected content name as well as the identifier of the selected display device, wherein the selected storage path comprises the selected content name;
    sending the selected storage path to the selected display device; and
    sending a playback request to the selected display device to enable the selected display device to acquire a media resource from the at least one media server according to the selected storage path and play the media resource,
    wherein receiving the query response returned by the central server, and determining the selected content name as well as the identifier of the selected display device according to the selection instruction comprises:
      receiving a pre-query response returned by the central server, wherein the pre-query response comprises the storage path of the at least one media resource, and the storage path points to one of the at least one media server that comprises the central server;

determining the content name of the at least one media resource according to the storage path of the at least one media resource;

displaying the content name of the at least one media resource;

receiving a first single selection instruction, wherein the first single selection instruction comprises the selected content name, and the selected content name is one of the content name of the at least one media resource;

sending a selected request that comprises the selected content name to the central server; and receiving the query response returned by the central server, wherein the query response includes the storage path of the at least one media resource corresponding to the selected content name as well as the identifier of the optional display device, wherein the storage path of the at least one media resource comprises the selected content name, and wherein determining, from the storage path of the at least one media resource, the selected storage path corresponding to the selected content name as well as the identifier of the selected display device comprises:

receiving a second single selection instruction, wherein the second single selection instruction comprises the identifier of the selected display device; and determining, from the storage path of the at least one media resource corresponding to the selected content name, the selected storage path corresponding to the identifier of the selected display device.

13. The method according to claim 12, wherein before determining, by the control device, the query condition, the method further comprises:

identifying, by the control device, at least one display device and the at least one media server; and identifying the central server from the at least one media server.

14. The method according to claim 12, wherein receiving the query response returned by the central server, and determining the selected content name as well as the identifier of the selected display device according to the selection instruction comprises:

receiving the query response;

determining a content name of the at least one media resource according to the storage path of the at least one media resource;

displaying the content name of the at least one media resource and an identifier of the at least one display device; and receiving a double selection instruction, wherein the double selection instruction comprises the selected content name as well as the identifier of the selected display device, and the selected content name is one of the content name of the at least one media resource.

15. The method according to claim 14, wherein the query response comprises an original resource response entry and a converted resource response entry, wherein the original resource response entry comprises an original identifier, a storage path of an original media resource, and an identifier of a first display device, and the converted resource response entry comprises a conversion identifier, a storage path of a converted media resource, and an identifier of a second display device, wherein displaying the content name of the at least one media resource comprises:

determining content names corresponding to the original resource response entry and those corresponding to the converted resource response entry; and determining at least one resource family response entry, wherein the resource family response entry comprises an original resource response entry and a converted resource response entry corresponding to a same content name, and displaying a content name of each resource family entry, and wherein determining, from the storage path of the at least one media resource, the selected storage path corresponding to the selected content name as well as the identifier of the selected display device comprises:

determining a resource family response entry corresponding to the selected content name;

determining that a storage path in the original resource response entry is the selected storage path when the original resource response entry that comprises the identifier of the selected display device exists in the corresponding resource family response entry; and determining that a storage path in the converted resource response entry is the selected storage path when the original resource response entry that comprises the identifier of the selected display device does not exist in the corresponding resource family response entry, and the converted resource response entry that comprises the identifier of the selected display device exists in the corresponding resource family response entry.

16. The method according to claim 15, wherein displaying the content name of the at least one media resource and the identifier of the at least one display device comprises binding and displaying the content name of each resource family response entry and the identifier of the first display device.

17. A central server, comprising:

a non-transitory computer readable storage medium having instructions stored thereon; and a computer processor coupled to the non-transitory computer readable medium and configured to execute the instructions to:

receive a query request of a control device;

return a query response to the control device according to a pre-generated resource information table, wherein the query response comprises a storage path of at least one media resource;

receive a resource request of a selected display device selected by the control device, wherein the resource request comprises information about a selected storage path;

query the resource information table;

determine that a selected media resource corresponding to the information about the selected storage path is stored on a first media server;

determine a second media server with a conversion capability to convert a media format of the selected media resource into a media format supported by a playback capability of the selected display device to enable the selected display device to play a media resource converted by the second media server from the selected media resource;

acquire playback capability information of at least one display device that comprises the selected display device, as well as media content information and conversion capability information of a plurality of media servers that comprise the first media server and the second media server;

generate the resource information table according to the playback capability information of the at least one display device as well as the media content information and the conversion capability information of the plurality of media servers, wherein the resource information table comprises a resource identifier, a media format, and a storage path of at least one media resource, wherein the resource information table comprises an original resource entry and a converted resource entry;

determine a playback capability intersection set according to the playback capability information of the at least one display device, wherein a playback capability of each display device supports at least one media format in the playback capability intersection set;

determine an original media resource according to the media content information of the plurality of media servers and generate the original resource entry, wherein the original resource entry comprises an original identifier as well as a resource identifier, a media format, and a storage path of the original media resource, and the storage path of the original media resource points to the first media server that stores the original media resource;

determine, according to a media format that is in the playback capability intersection set and is different from the media format of the original media resource, a converted media resource corresponding to the original media resource, and generate the converted resource entry corresponding to the original resource entry, wherein the converted resource entry comprises a conversion identifier as well as a resource identifier, a media format, and a storage path of the converted media resource, and the storage path of the converted media resource points to the central server; and establish a correspondence between the converted resource entry and a media server with a conversion capability to convert the media format of the original media resource into the media format of the converted media resource, wherein the media format of the converted media resource is different from the media format of the corresponding original media resource, and the media format of the converted media resource is in the playback capability intersection set.

18. The central server according to claim 17, wherein the computer processor is further configured to execute the instructions to:
query the resource information table according to a query condition comprised in the query request;
determine an original resource entry that meets the query condition;
add a corresponding original resource response entry to the query response, wherein the original resource response entry comprises the original identifier and the storage path of the original media resource that are in the original resource entry;
determine a converted resource entry that meets the query condition; and
add a corresponding converted resource response entry to the query response, wherein the converted resource response entry comprises the conversion identifier and the storage path of the converted media resource that are in the converted resource entry.

19. The central server according to claim 18, wherein the computer processor is further configured to execute the instructions to:

find a converted resource entry that comprises the selected storage path according to the information about the selected storage path in the resource request;
determine an original resource entry corresponding to the converted resource entry that comprises the selected storage path;
determine the first media server to which a storage path in the corresponding original resource entry points; and
determine the second media server corresponding to the converted resource entry that comprises the selected storage path.

20. The central server according to claim 18, wherein the original resource entry further comprises an identifier of a first display device, wherein a playback capability of the first display device supports the media format in the original resource entry, wherein the converted resource entry further comprises an identifier of a second display device, wherein a playback capability of the second display device supports the media format in the converted resource entry, wherein the corresponding original resource response entry further comprises the identifier of the first display device in the original resource entry, and wherein the corresponding converted resource response entry further comprises the identifier of the second display device in the converted resource entry.

21. The central server according to claim 20, wherein the computer processor is further configured to execute the instructions to:
acquire conversion capability information of the at least one display device;
determine a comprehensive playback capability of each display device according to the playback capability information and the conversion capability information of the at least one display device;
generate the resource information table according to the playback capability information and the conversion capability information of the at least one display device as well as the media content information and the conversion capability information of the plurality of media servers, wherein the resource information table comprises the resource identifier, the media format, and the storage path of the at least one media resource and an identifier of an optional display device, and a comprehensive playback capability of the optional display device supports the media format.

22. The central server according to claim 21, wherein the computer processor is further configured to execute the instructions to determine the playback capability intersection set according to the playback capability information and the conversion capability information of the at least one display device, wherein the comprehensive playback capability of each display device supports at least one media format in the playback capability intersection set.

23. The central server according to claim 17, wherein the computer processor is further configured to execute the instructions to:
acquire the selected media resource from the first media server when the central server is the second media server;
convert the selected media resource to obtain a selected media resource after conversion;
send the selected media resource after conversion to the selected display media;
redirect the resource request to the second media server when the central server is not the second media server to enable the second media server to acquire the selected media resource from the first media server, to convert the selected media resource to obtain a selected media resource after conversion, and to send the selected media resource after conversion to the selected display device;
instruct the second media server to acquire the selected media resource from the first media server when the central server is not the second media server to enable the second media server to convert the selected media resource and return a selected media resource after conversion to the central server; and
send the selected media resource after conversion to the selected display device.

24. The central server according to claim 23, wherein the computer processor is further configured to execute the instructions to:
download the selected media resource after conversion from the second media server when the central server is the first media server;
instruct the first media server to download the selected media resource after conversion from the second media server or the central server when the central server is not the first media server; and
update the resource information table according to the selected media resource after conversion.

25. A control device, comprising:
a non-transitory computer readable storage medium having instructions stored thereon; and
a computer processor coupled to the non-transitory computer readable medium and configured to execute the instructions to:
determine a query condition;
send a query request that comprises the query condition to a central server;
receive a query response returned by the central server;
determine a selected content name as well as an identifier of a selected display device according to a selection instruction, wherein the query response comprises a storage path of at least one media resource and an identifier of an optional display device, and the storage path points to one of at least one media server that comprises the central server;
determine, from the storage path of the at least one media resource, a selected storage path corresponding to the selected content name as well as the identifier of the selected display device, wherein the selected storage path comprises the selected content name, and send the selected storage path to the selected display device;
send a playback request to the selected display device to enable the selected display device to acquire a media resource from the at least one media server according to the selected storage path and play the media resource;
receive a pre-query response returned by the central server, wherein the pre-query response comprises the storage path of the at least one media resource, and the storage path points to one of the at least one media server that comprises the central server;
determine the content name of the at least one media resource according to the storage path of the at least one media resource;
display the content name of the at least one media source;
receive a first single selection instruction, wherein the first single selection instruction comprises the selected content name, and the selected content name is one of the content name of the at least one media resource;
send a selected request that comprises the selected content name to the central server;
receive the query response returned by the central server, wherein the query response comprises the storage path of the at least one media resource corresponding to the selected content name as well as the identifier of the optional display device, wherein the storage path of the at least one media resource comprises the selected content name;
receive a second single selection instruction, wherein the second single selection instruction comprises the identifier of the selected display device; and
determine, from the storage path of the at least one media resource corresponding to the selected content name, the selected storage path corresponding to the identifier of the selected display device.

26. The control device according to claim 25, wherein the computer processor is further configured to execute the instructions to:
identify at least one display device and the at least one media server; and
identify the central server from the at least one media server.

27. The control device according to claim 25, wherein the computer processor is further configured to execute the instructions to:
receive the query response;
determine a content name of the at least one media resource according to the storage path of the at least one media resource;
display the content name of the at least one media resource and an identifier of the at least one display device; and
receive a double selection instruction, wherein the double selection instruction comprises the selected content name as well as the identifier of the selected display device, and the selected content name is one of the content name of the at least one media resource.

28. The control device according to claim 27, wherein the query response comprises an original resource response entry and a converted resource response entry, wherein the original resource response entry comprises an original identifier, a storage path of an original media resource, and an identifier of a first display device, and the converted resource response entry comprises a conversion identifier, a storage path of a converted media resource, and an identifier of a second display device, and wherein the computer processor is further configured to execute the instructions to:
determine content names corresponding to the original resource response entry and those corresponding to the converted resource response entry;
determine at least one resource family response entry, wherein the resource family response entry comprises an original resource response entry and a converted resource response entry corresponding to a same content name;
display a content name of each resource family response;
determine a resource family response entry corresponding to the selected content name;
determine that a storage path in the original resource response entry is the selected storage path when the original resource response entry that comprises the identifier of the selected display device exists in the corresponding resource family response entry; and determine that a storage path in the converted resource response entry is the selected storage path when the original resource response entry that comprises the identifier of the selected display device does not exist in the corresponding resource family response entry, and the converted resource response entry that comprises the identifier of the selected display device exists in the corresponding resource family response entry.

29. The control device according to claim 28, wherein the computer processor is further configured to execute the instructions to bind and display the content name of each resource family response entry and the identifier of the first display device.

30. A control device, comprising:
a non-transitory computer readable storage medium having instructions stored thereon; and
a computer processor coupled to the non-transitory computer readable medium and configured to execute the instructions to:
determine a query condition and send a query request that comprises the query condition to a central server;
receive a query response returned by the central server;
determine a selected content name as well as an identifier of a selected display device according to a selection instruction, wherein the query response comprises a storage path of at least one media resource and an identifier of an optional display device, and the storage path points to one of at least one media server that comprises the central server;
determine, from the storage path of the at least one media resource, a selected storage path corresponding to the selected content name as well as the identifier of the selected display device, wherein the selected storage path comprises the selected content name;
send the selected storage path to the selected display device;
send a playback request to the selected display device to enable the selected display device to acquire a media resource from the at least one media server according to the selected storage path and play the media resource,
receive the query response;
determine a content name of the at least one media resource according to the storage path of the at least one media resource;
display the content name of the at least one media resource and an identifier of the at least one display device;
receive a double selection instruction, wherein the double selection instruction comprises the selected content name as well as the identifier of the selected display device, and the selected content name is one of the content name of the at least one media resource, wherein the query response comprises an original resource response entry and a converted resource response entry, wherein the original resource response entry comprises an original identifier, a storage path of an original media resource, and an identifier of a first display device, wherein the converted resource response entry comprises a conversion identifier, a storage path of a converted media resource, and an identifier of a second display device;
determine content names corresponding to the original resource response entry and those corresponding to the converted resource response entry;
determine at least one resource family response entry, wherein the resource family response entry comprises an original resource response entry and a converted resource response entry corresponding to a same content name;
display a content name of each resource family response;
determine a resource family response entry corresponding to the selected content name;
determine that a storage path in the original resource response entry is the selected storage path when the original resource response entry that comprises the identifier of the selected display device exists in the corresponding resource family response entry; and
determine that a storage path in the converted resource response entry is the selected storage path when the original resource response entry that comprises the identifier of the selected display device does not exist in the corresponding resource family response entry, and the converted resource response entry that comprises the identifier of the selected display device exists in the corresponding resource family response entry.

* * * * *